(12) United States Patent
Nagashima et al.

(10) Patent No.: US 6,171,010 B1
(45) Date of Patent: Jan. 9, 2001

(54) BOOT WITH SPACED COUPLING PORTIONS

(75) Inventors: Atsushi Nagashima; Mitsuru Kitaura, both of Ogasa-gun; Katsuhiko Aramaki, Kitakyusyu; Yoshiaki Taka, Yokohama, all of (JP)

(73) Assignee: NOK Corporation, Tokyo (JP)

( * ) Notice: Under 35 U.S.C. 154(b), the term of this patent shall be extended for 0 days.

(21) Appl. No.: 08/998,711

(22) Filed: Dec. 29, 1997

(30) Foreign Application Priority Data

Jan. 25, 1996 (JP) .................................................. 8-11081
Dec. 25, 1996 (JP) ................................................ 8-345803

(51) Int. Cl.[7] .................................................... F16J 15/52
(52) U.S. Cl. .......................... 403/51; 403/344; 277/634; 277/635; 277/636
(58) Field of Search ..................... 277/634, 635, 277/636; 403/50, 51, 326, 329, 336, 344, 316, 319; 464/175; 24/409, 410, 411, 412, 413, 414, 615, 621, 622, 623, 625, 698.1, 700

(56) References Cited

U.S. PATENT DOCUMENTS

| | | | | |
|---|---|---|---|---|
| 428,058 | * | 5/1890 | Richards | 403/344 |
| 1,702,426 | * | 2/1929 | Anderegg | 24/587 |
| 2,682,684 | * | 7/1954 | Kraft | 425/17 |
| 3,023,036 | * | 2/1962 | Taylor | 403/344 |
| 3,196,878 | * | 7/1965 | Hedu . | |
| 3,617,077 | * | 11/1971 | Cavanaugh | 287/53 H |
| 4,263,698 | * | 4/1981 | Moertel | 24/205.13 R |
| 4,418,449 | * | 12/1983 | Heimberger et al. | 24/401 |
| 4,466,754 | * | 8/1984 | Poitier | 403/11 |
| 4,471,496 | * | 9/1984 | Gardner, Jr. et al. | 2/209 |
| 4,513,482 | * | 4/1985 | Fukuroi | 24/384 |
| 4,558,869 | | 12/1985 | Grove et al. . | |
| 4,620,815 | * | 11/1986 | Goetter | 403/405.1 |
| 4,651,388 | * | 3/1987 | Horikawa et al. | 24/409 |
| 4,676,513 | * | 6/1987 | Tiegs et al. . | |
| 4,813,913 | | 3/1989 | Belter . | |
| 5,138,855 | * | 8/1992 | Faris | 70/457 |
| 5,163,874 | * | 11/1992 | Engelstad | 464/49 |
| 5,385,373 | * | 1/1995 | Love | 292/307 |
| 5,431,601 | | 7/1995 | Nakamura . | |
| 5,435,425 | * | 7/1995 | Ijames | 192/13 R |
| 5,440,792 | * | 8/1995 | Ida | 24/615 |
| 5,509,864 | * | 4/1996 | Hauser | 475/316 |
| 5,678,285 | * | 10/1997 | Germani | 24/418 |
| 5,845,911 | * | 12/1998 | Gimino | 277/636 |

FOREIGN PATENT DOCUMENTS 33 09 940 C1    4/1984    (DE) .

* cited by examiner

*Primary Examiner*—Anthony Knight
*Assistant Examiner*—Alison K. Pickard
(74) *Attorney, Agent, or Firm*—Oliff & Berridge, PLC

(57) ABSTRACT

A male coupling portion of a first split portion on one side of a split boot is coupled to a female coupling portion of a second split portion using a plurality of spaced male and female coupling portions. A worker can simply couple the split portions of split boot without using any machine while enhancing the coupling force of split faces.

7 Claims, 22 Drawing Sheets

BOOT WITH SPACED COUPLING PORTIONS

BACKGROUND OF THE INVENTION

1. Field of the Invention

The present invention relates to a boot to be assembled in split for sealing the slide portion of flexible coupling mounted to a shaft. This invention relates in particular to the boot which can be opened from its lateral side for its fitting with the shaft being interconnected to the flexible coupling.

2. Description of the Related Art

The boot shown in FIG. 26 and FIG. 27 exists to the prior art relating to this invention.

FIG. 26 is an oblique view of the boot with its split face being opened. FIG. 27 is a cross sectional view with its split face being coupled.

The bellows status split boot 51 in FIG. 26 is split in the axial direction at one place, and the split face on one hand is not only formed on an insertion piece 52 and the split face on the other hand is formed to an annular concave 55 so that these split faces may be coupled mutually to each other.

FIG. 27 indicates the status where the insertion piece 52 is press-fitted for its coupling into this annular concave 55.

In FIG. 27, the insertion piece 52 having the split face on one hand is formed into a sickle state from the split face and has an engaging stage portion 53 swollen out to both the sides. And, it is formed to a slope face 54 being throttled toward the tip from both the sides of engaging stage portion 53. This insertion piece 52 is formed over the entire length in the axial direction along the bellows status split face.

Next, the annular concave portion 55 is formed to the split face on the other hand so that the insertion piece 52 can be inserted. This annular concave portion 55 opens with the protrusion piece 56 being provided on both the sides of split, and its interior is formed to the space of triangle shape in its cross section so that the tip side of insertion piece 52 can be engaged having an interval.

And, when the insertion piece 52 is press-fitted into the annular concave portion 55, it can be fitted as shown in FIG. 27 with the engaging stage portion being engaged to the protrusion piece and both the split faces tend to maintain the coupled status.

SUMMARY OF THE INVENTION

Because the above mentioned boot is formed into a bellows shape and is but also structured flexibly, it includes a significant amount of rubber material. Therefore, because the friction of rubber material is great when inserting and coupling the insertion piece 52 into the annular concave portion 55, the insertion process is difficult. Moreover, because the boot is crooked in order to from a bellows, the insertion process becomes further difficult and the work efficiency decreases.

Further, for improving the above mentioned prior art, there exists another prior art where the reinforcing materials are buried inside the annular concave portion and inside the insertion piece of FIG. 13. The reinforcing material is made of a wire which is bent to a bellows status into the formation of flat face, and this plate shape material is formed into a concave status and buried into the outside circumference side in the space of annular concave portion. Further, the reinforcing material of insertion piece is made of wire that is bent into a bellows status into the formation of plate status and is buried in such that it may be laid toward the tip direction with the insertion piece at its center.

However, even in this split boot, the wire can not be thickened because the flexibility of boot entirety aggravates, and it is difficult to solve the above mentioned defects. Moreover, if a strong force acts on the boot 51, the split faces open resulting in the outflow of lubricating oil.

The present invention has been conceived in consideration of the above mentioned problematic points, and its object resides in not only facilitating the coupling of split faces but also strengthening the coupling force between the split faces.

Another object of this invention resides in strengthening the joint force of split faces and enhancing the sealing force of split faces. A further object resides in enabling the split coupling even if a diversity of materials such as rubber material, resin material, etc. should be adopted to the material of the boot.

The present invention has been conceived for solving the above mentioned themes, and its technical means is structured as follows.

A boot according to the present invention includes a mounting portion on both of the end sides of an annular body. The boot is formed attachable to the shaft coupling and is split in an axial direction having a first split portion on a split face side and a second split portion on the split face side. The first split portion has a fixed portion fixed inside the first split portion and an insertion portion protruding from the fixed portion and a male coupling portion having an engaging portion protrusive to the insertion portion. The second split portion has an acceptance portion into which the insertion portion is to be inserted and a female coupling portion having an engaging female portion which closely mates the split face of the first split portion and the split face of the second split portion mutually to the acceptance portion for engagement to the engaging portion.

The engaging portion only protrude out of the lateral face of insertion portion, and at least one of the acceptance and the engaging portion is elastically deformed by the mutual pressure.

The empty chamber of the acceptance portion may be formed to a larger size against the insertion portion for its idle fitting.

The boot may be made of rubber state elastic material, and the coupling portion may be made of a harder material than the rubber state elastic material and the engaging portion may be formed on a top shape outside face tapering to its tip, and a female coupling portion may be made of a harder material than the rubber state elastic material and may also be formed to a female hole mating with the engaging portion for its engagement.

The acceptance portion may be formed to an oval hole in the direction along the second split portion and the insertion portion mating to the acceptance portion may be formed to the long width corresponding to the oval hole of acceptance portion and have a concave portion formed toward the fixed portion from the tip face.

The fixed portion of male coupling portion may be integrally interconnected by an interconnection plate having a flexibility along the first split portion respectively and the female coupling portion may be integrally interconnected by an interconnection plate having a flexibility along the second split portion respectively.

The boot may be a male coinciding portion formed to a convex portion on one side of the first split portion and the second split portion and a female coinciding portion formed to a concave portion so that the other portion may mate to the male coinciding portion. The boot may have an engaging groove at the root of male coinciding portion and a hook portion coupling with the coinciding groove to the end portion of concave portion of female coinciding portion.

In the boot according to the present invention, when the engaging portions 8 and 108 a the first split portion should be elastically inserted into and coupled with the coinciding female portions 13 and 113 of acceptance portion of the second split portion, the respective split faces of the first split portion and second split portion get in close contact with each other to prevent the outflow or inflow of fluid into or out of the boot. At the same time, since the insertion portion and acceptance portion are coupled and engaged in one touch, the coupling of mutual split portions becomes facilitated. Because especially it is just all right to couple the male coupling portion with the female coupling portion even if the elasticity deformation should be large like the boot which is made of rubber material, the coupling can be made with no regard to the coupling handling due to the material of boot.

The acceptance portion may elastically open the space or the engaging portion may be pressed against the acceptance portion for its elastic deformation, or both of the parts may be elastically deformed so that both the parts may be inserted together and both of the parts are coupled when the acceptance portion 12 and the engaging portion 8 of insertion portion are mutually inserted into each other. For this reason, when both of the members should be restored from the elastic deformation, the coinciding male portion and the engaging portion can be engaged with each other so as to press fit the split faces of both the split portions. In this way, the male coupling portion 4 and the female coupling portion 5 provided along the axial direction of split faces are sequentially coupled with each other. As a result, the boot 1 can be inserted from the lateral side of flexible coupling.

Because the empty chamber 12c of acceptance portion may be formed to a larger size than the shape of insertion portion 6, it can be strongly contacted with the split faces of both the split portions because the engaging portion 8 alone can be strongly engaged with the coinciding female portion 13 in the idle status even if the dimension accuracy of both the parties should be more or less incorrect in the engagement.

If the respective top status outer faces 110 of engaging portion 108 of the male coupling portion 104 should be sequentially engaged to the engaging coinciding portions 113 of the female coupling portion 105, they can be easily coupled with each other because each top status outer face 110 is strongly coupled with each coinciding female portion 113. And it becomes possible to close the flexible coupling by getting the male coupling portion 104 closely contacted with the female coupling portion 105. And by making the male coupling portion 104 and the female coupling portion 105 from the resin material, both the parts can be press-fitted for their coupling to each other.

The insertion portion 106 and the acceptance portion 112 may be formed into a long shape in the longitudinal direction of split and a concave portion may be provided to the insertion portion for its structure of elasticity deformation during its insertion. Thus, both of the split portions can be strongly coupled with each other and the coupling work of both of the split portions can be made without difficulty.

Because the male coupling portion 104 and female coupling portion 105 may be integrally interconnected by use of the interconnection plate 117, both of the parts can be correctly aligned with each other when coupling the male coupling portion with the female coupling portion. Further, the coupling force between the male coupling portion and the first split portion and the coupling force between the female coupling portion and the second split portion become strong.

In the boot of this invention, because the coinciding portion 118 may be formed to the first split portion 102 and the female coinciding portion 119 may be formed to the second split portion 103, the coupled split face will not open and therefore can be securely contacted even if the boot should be subjected to the action of large deformation.

DETAILED DESCRIPTION OF PREFERRED EMBODIMENTS

Hereunder, the boot in the mode of embodiment according to this invention is to be expounded with reference to the drawings.

Figure 1:
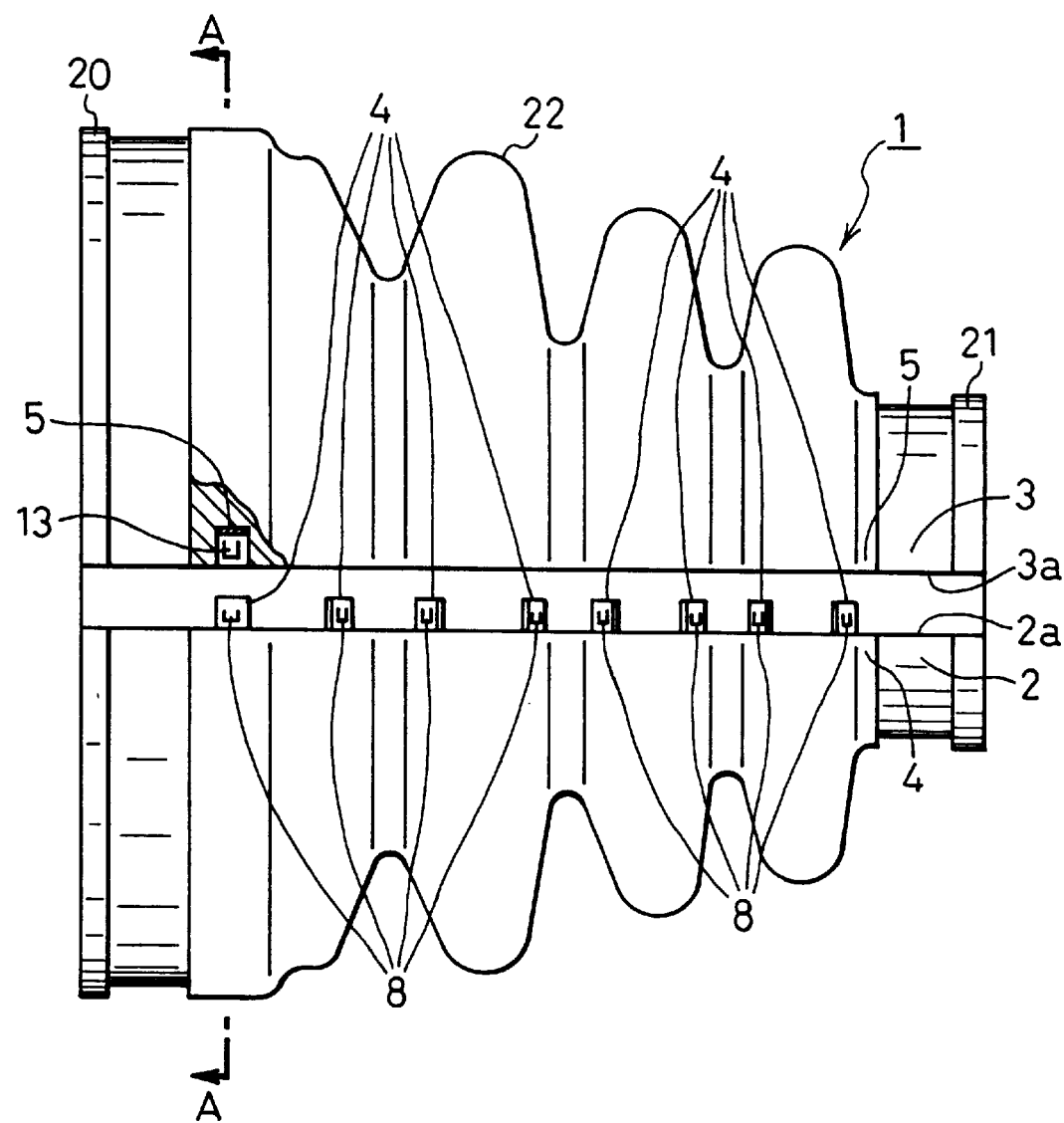
FIG. 1 is a lateral face view before coupling the boot in the mode of one embodiment according to this invention.

FIG. 1 is a lateral side view showing the boot in the mode of first embodiment of the present invention.

Numeral 1 in FIG. 1 stands for a boot. A large diameter side mounting portion 20 coupling to the flexible coupling at both the end sides and a small diameter side mounting portion 21 coupling to the shaft are formed on the boot 1. And a bellows portion 22 is formed in the middle of both mounting portions 20 and 21. The boot 1 made of rubber material is split at one place in the axial direction, and a first split face 2a is not only formed to the first split portion 2 but a second split face 3a is also formed to a second split portion 3.

Figure 2:
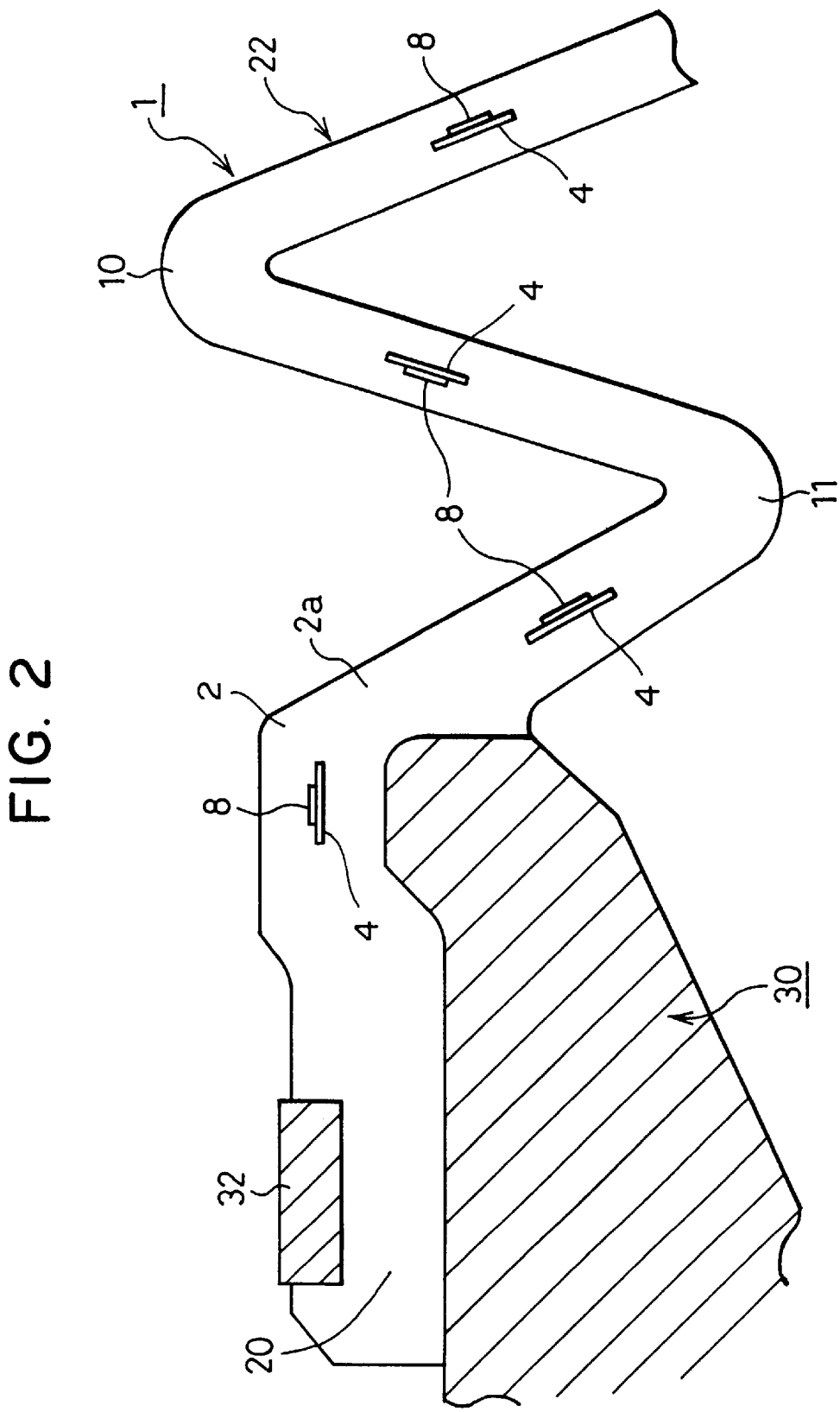
FIG. 2 is a lateral face view on the larger diameter side mounted portion side of first split face of FIG. 1.

FIG. 2 is a major portion lateral face view looking at the first split portion 2 of FIG. 1 from the side of second split portion 3.

To the first split portion 2, a plurality of male coupling portions 4 are arranged along the axial direction. This arrangement is one of the embodiments, and the coupling portions are laid out in a great number according to the size of boot. Further, if the male coupling portion 4 and the female coupling portion 5 are also installed to the crest portion 10 and the valley portion 11, the shapes of male coupling portion 4 and female coupling portion 5 are also formed to the crest shape and the valley shape when viewed from the front face of the respective split portions 2 and 3.

Figure 3:
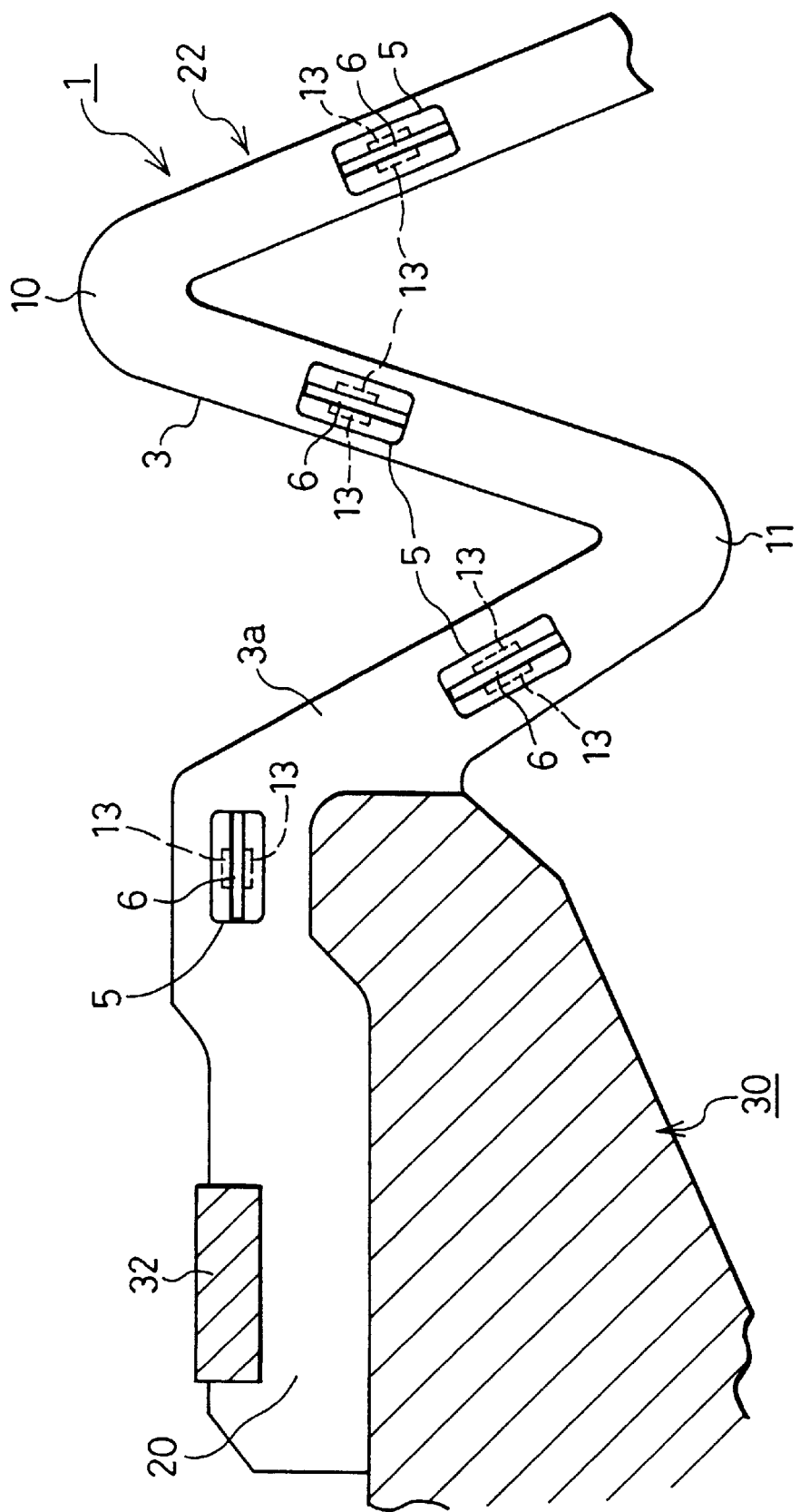
FIG. 3 is a lateral face view of large diameter side mounted portion side of second split face of FIG. 1.

Further, to the second split portion 3, the female coupling portion 5 is arranged along the axial direction at the position corresponding to the male coupling portion 4 of first split face 2a as shown in FIG. 3.

Figure 4:
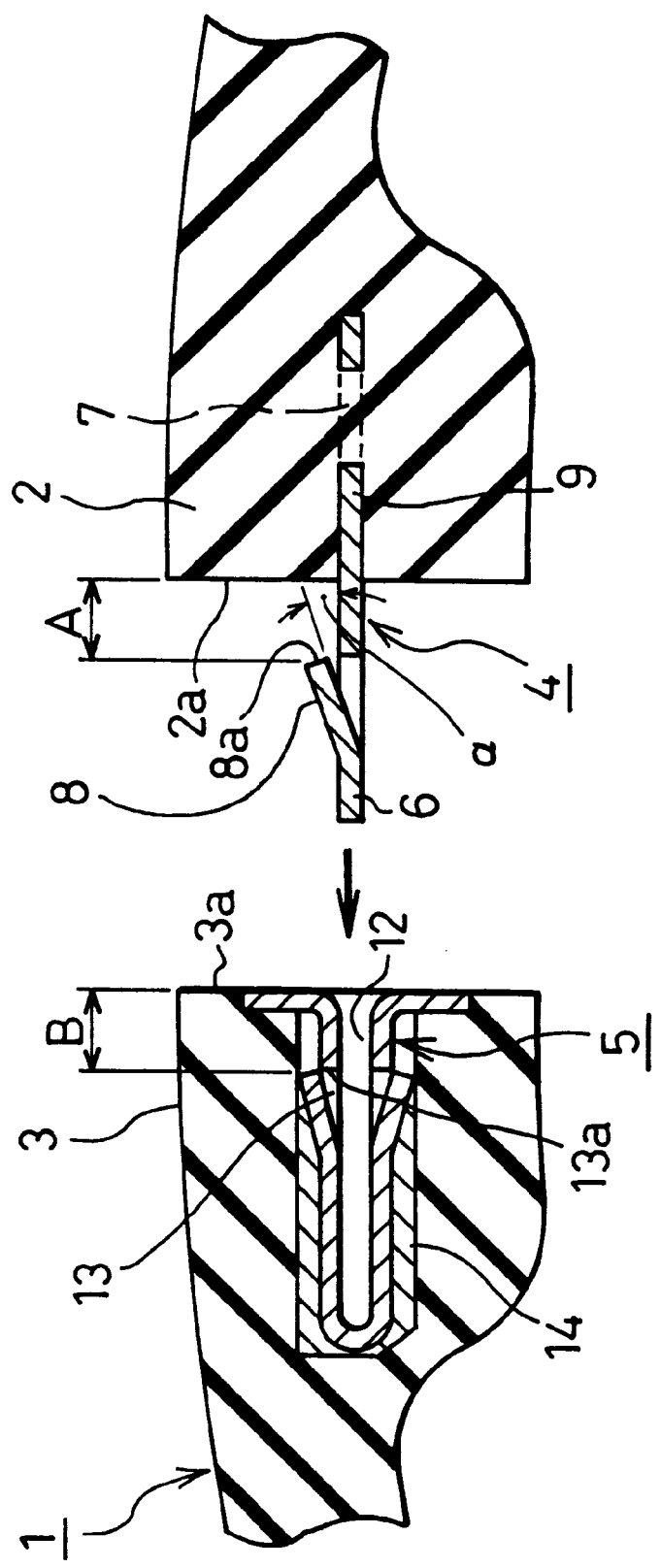
FIG. 4 is a cross sectional view showing the male coupling portion and the female coupling portion owned to the split portion shown in FIG. 1.

FIG. 4 is a cross sectional view showing the engaging portion 8 and the coinciding portion 13 taken along the line A—A of FIG. 1. Out of them, the mounting structure of male coupling portion 4 is formed like the right side of FIG. 4. The male coupling portion 4 is made of metal plate having a flexibility, which is shaped to a rectangularity when viewed from the plane face, and the engaging portion 8 forming a cantilever beam shape whose three sides are cut and inclined is formed to the insertion portion 6. The inclination angle of this engaging portion 8 is shaped to 20°. Further, the inclination angle α should preferably be set to the range from 5 to 30°. Further, the size of distance "A" from the first split face 2a to the tip portion 8a of engaging portion 8 needs to be smaller than the size of distance "B" from the contact portion 13a of female coupling portion 5 to the second split face 3a. In addition, the engaging portion may also be structured in a way to have an elasticity by the heat treatment.

An integral portion 7 by the through hole is provided to the fixed portion 9 coupling with the first split portion 2 of male coupling portion 4, and the first split portion 2 penetrates though the integral portion 7 for its coupling integrally. This integral portion 7 may also be structured by coupling the pin to the fixed portion 9 in place of the hole.

The female coupling portion 5 interconnecting with the male coupling portion 4 is as shown on the left side of FIG. 4, and is adhered via the bonding agent 14 like a rubber paste to the second split portion 3.

This female coupling portion 5 not simply bends a metallic plate to a U-shape, but both the ends are further bent to a flange shape, and its interior forms an acceptance portion 12 into which the male coupling portion 4 can be inserted easily. The acceptance portion 12 of U-letter shape is structured to elasticity like a leaf spring. This female coupling portion 5 is structured to have an elasticity by spring steel, etc. or by hardening.

The coinciding female portion 13 of V-shape space coinciding with the engaging portion 8 is formed to the acceptance portion 12 into which the insertion portion 6 of this male coupling portion 4 is to be inserted. This coinciding portion 13 is formed to the shape approximate with the engaging portion 8, and is formed to a concave accepting the engaging portion 8.

The female coupling portion 5 is inserted in such a way that if the insertion portion 6 of male coupling portion should be press-fitted, the engaging portion 8 is not only pressure fitted but the acceptance portion 12 of U-shape may be opened slightly elastically. And when the engaging portion 8 should reach the stipulated position, it restores to its original shape by the elasticity and gets coincided with the coinciding female portion 13. At this time, the "A" size of male coupling portion 4 shown in FIG. 4 is made smaller than the "B" size of female coupling portion 5 so that both the split faces 2a and 3a may be pressure fitted. This dimensional difference should preferably be set to the size from 0.5 to 1.0 mm.

Figure 5:
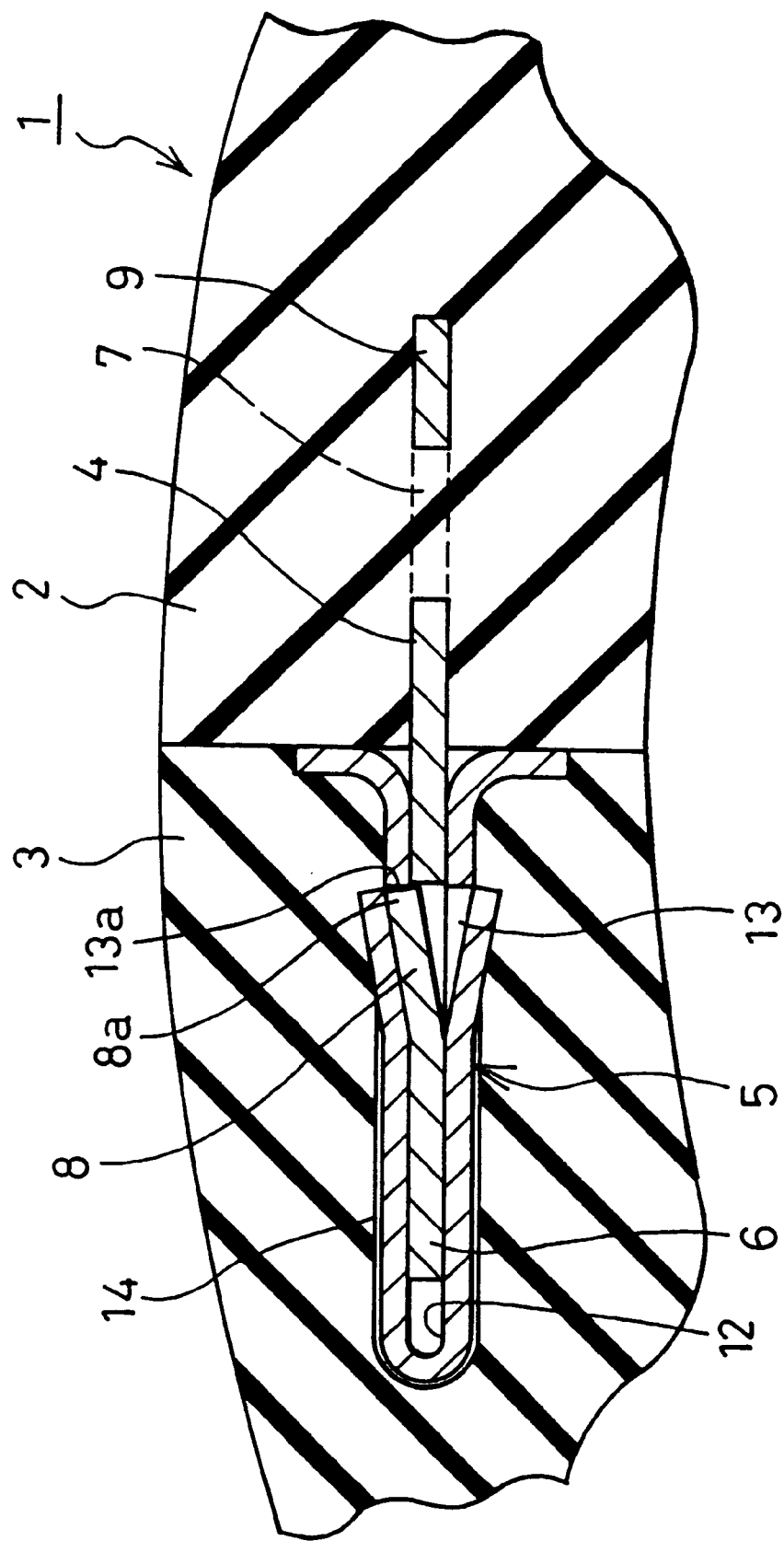
FIG. 5 is a cross sectional view having coupled the respective coupling portions of FIG. 4.

FIG. 5 is a status view which has coupled FIG. 4. In FIG. 5, the tip portion 8a of engaging portion 8 of male coupling portion 4 is pressed against and engaged with the contact portion 13a of coinciding female portion 13 of female coupling portion 5. Unless this engaging portion 8 should be pressed and deformed so that it may be the identical plane state with the insertion portion 6, the first split portion 2 can not be separated from the second split portion 3.

Figure 6:
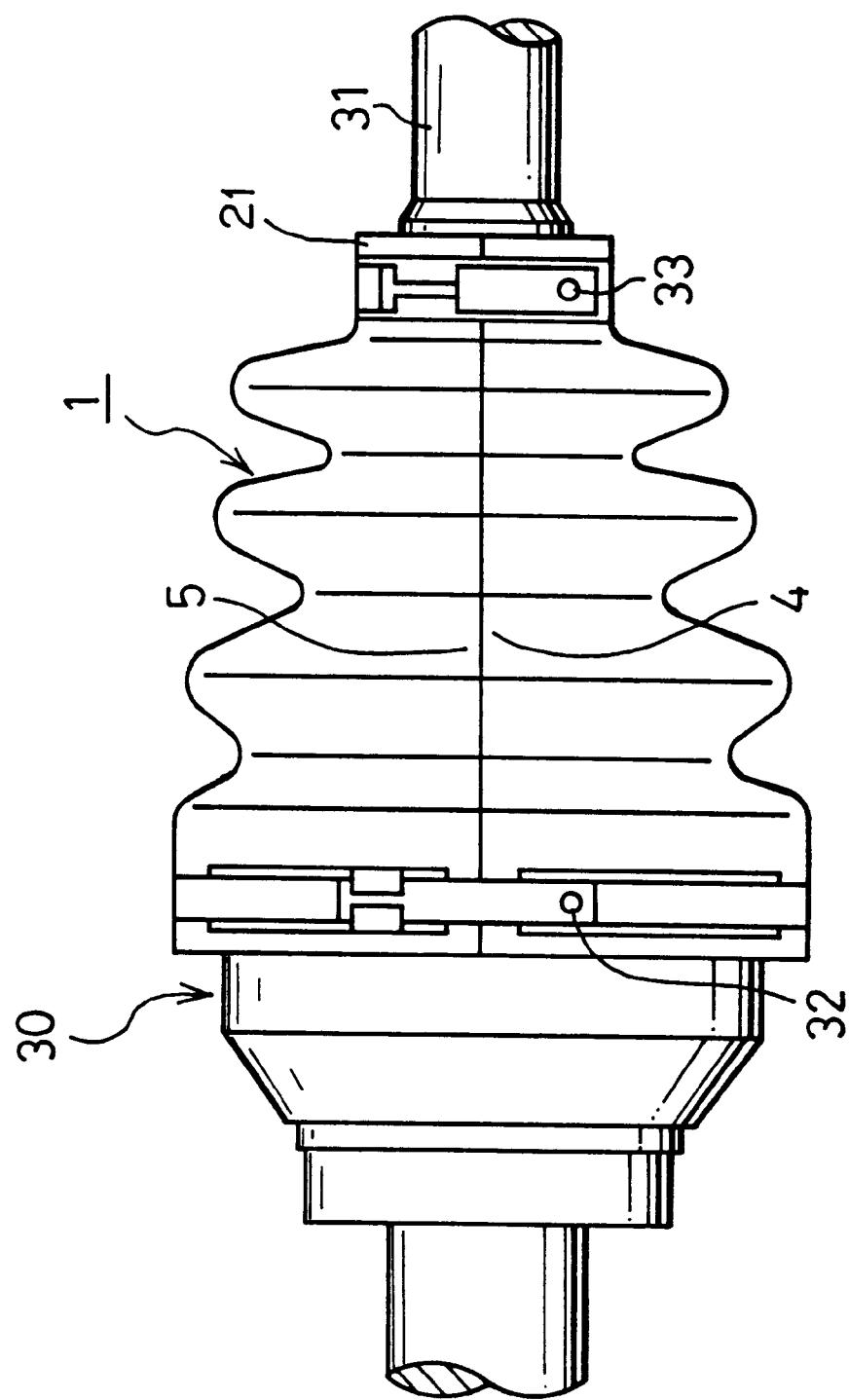
FIG. 6 is a lateral face view having mounted the boot of FIG. 1 to the shaft coupling.

FIG. 6 is a lateral face view where the male coupling portion 4 and female coupling portion 5 of boot 1 shown in FIG. 1 are coupled together and mounted to the shaft coupling. Further, it shall be so considered that the shaft coupling is structured of the flexible coupling 30 and shaft 31.

In FIG. 6, the flexible coupling 30 is interconnected in free angle with the shaft 31 via the bearing owned inside. And, the lubricating oil is intervened for protecting the sliding face on the side of this bearing.

For preventing the outflow of lubricating oil on the side of this bearing and the invasion of dust, etc., the boot 1 shall be fitted to the shaft coupling. As mentioned earlier, the space between the split faces 2a and 3a of boot 1 shall be opened from the lateral side of shaft coupling for its insertion, and the male coupling portion 4 and female coupling portion 5 shall be mutually coupled to each other into the status as shown in FIG. 6. And, not only the large diameter side mounting portion 20 shall be tightened via the first band 32 to the outside ring of flexible coupling 30 but the small diameter side mounting portion 21 shall also be tightened to the shaft 31 with the second band 33.

As a result, it becomes possible to eliminate such difficult needs as disassembling the flexible coupling from the unit, inserting the boot into this flexible coupling from the axial direction for its fitting, and assembling the flexible coupling 30 again to the drive unit of shaft 31 as conventionally required.

Figure 7:
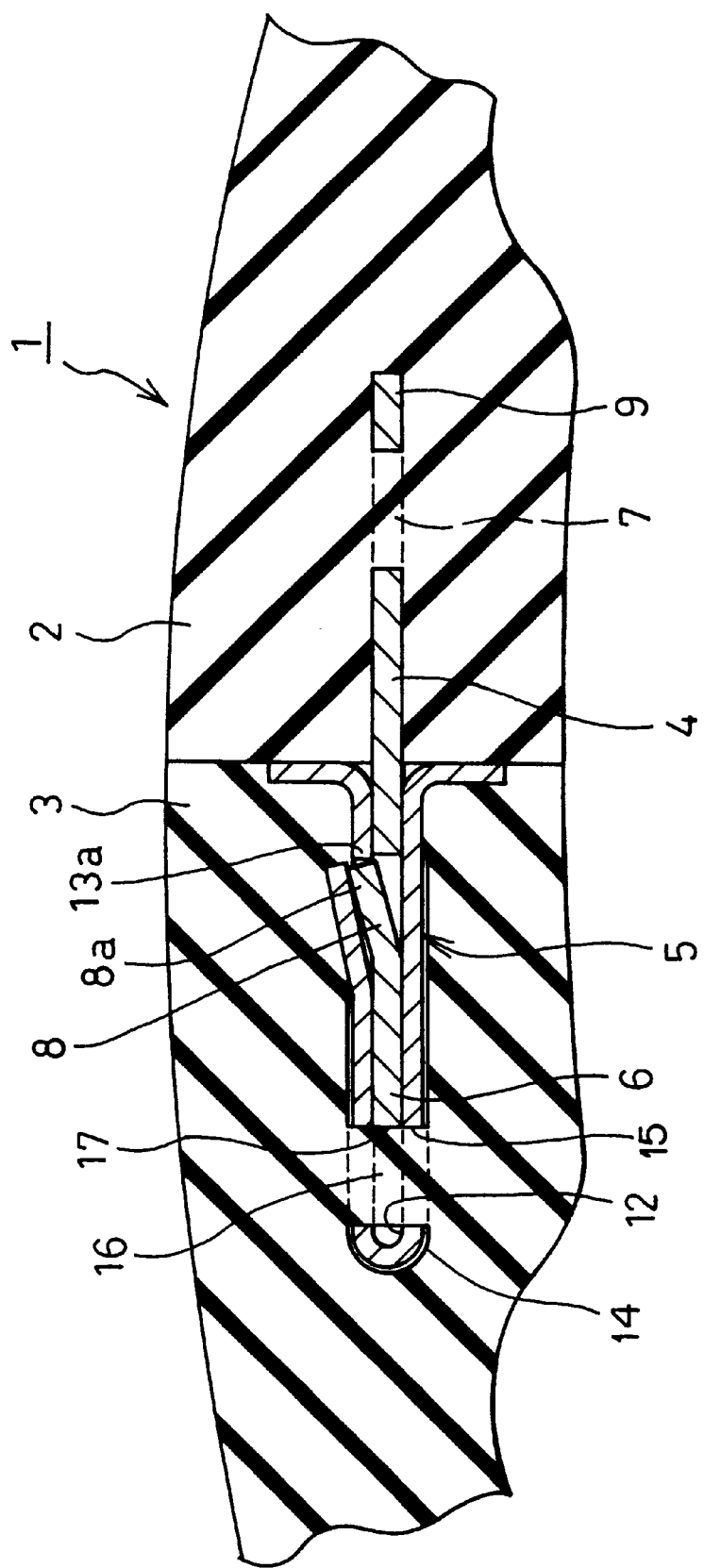
FIG. 7 is a cross sectional view of having coupled the first split portion and the second split portion, at each coupling portion, of boot in the mode of another embodiment relating to this invention.

FIG. 7 is a cross sectional view of coupling portion of boot showing the mode of second embodiment according to this invention.

In FIG. 7, a through-hole 15 is provided to the female coupling portion 5 and the elastic support portion 16 of the second split portion 3 is passed through this through-hole 15 during the formation and formed integrally in up/down sides. The elastic support portion 16 passing though this through-hole 15 is structured at the position in contact with the end face 17 of insertion portion 6.

And, by this elastic support portion 16, the tip face of male coupling portion 4 is not only supported, but the female coupling portion 5 is also coupled strongly to the second split portion 3.

Also, one piece of coinciding female portion 13 is installed on one side to the female coupling portion 5.

The female coupling portion 5 is structured of a metallic plate or a hard plastic material. And, during the molding of second split portion 3, the coupling portion 5 is integrally molded. Or, the parts may be bonded by use of a bonding agent 14.

The another structure of boot shown in FIG. 7 is approximately identical to the boot 1 shown in FIG. 1, as the parts are shown with the same symbols. And, in the boot 1 shown in FIG. 7, the male coupling portion 4 strongly couples inside the female coupling portion 5 by use of the elastic support portion 16.

Figure 8:
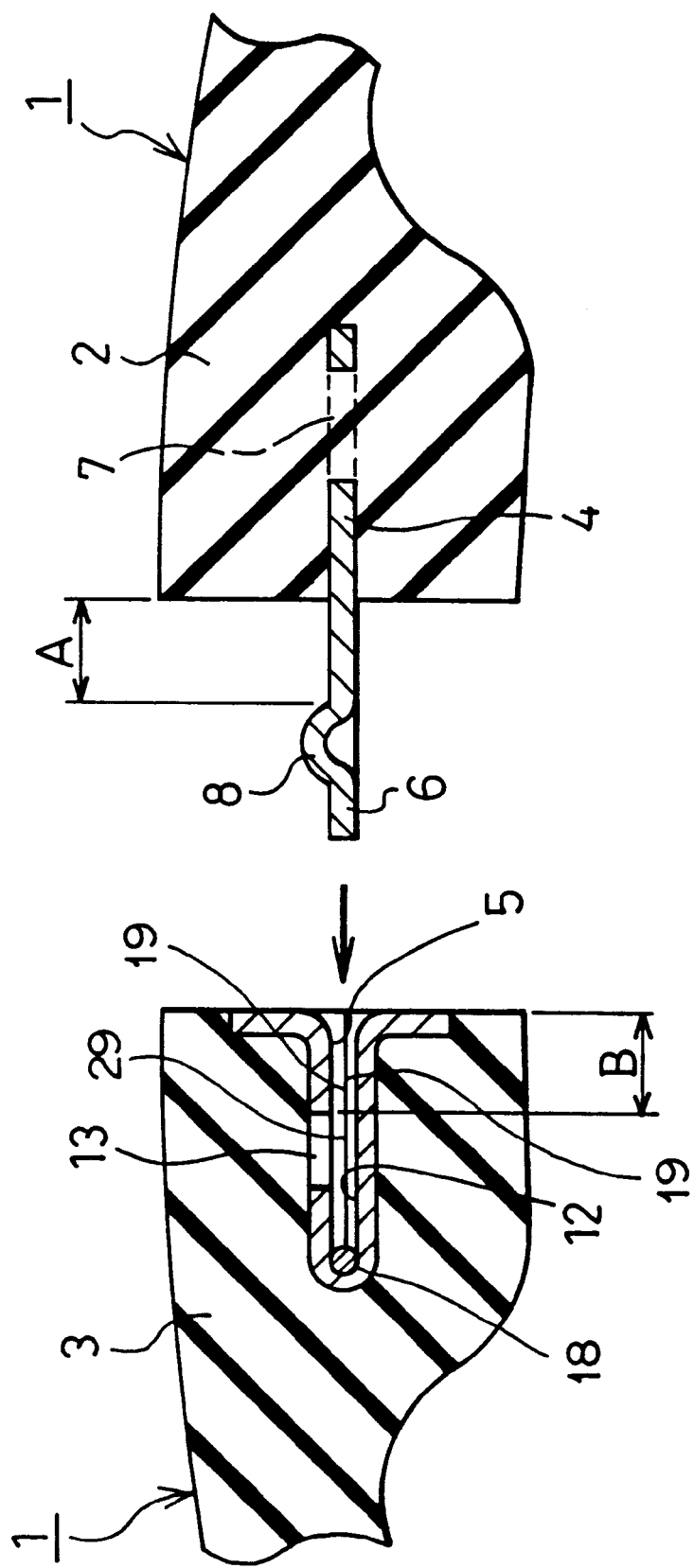
FIG. 8 is a cross sectional view showing each coupling portion owned to the first split portion and the second split portion in the mode of still another embodiment relating to this invention.

FIG. 8 is further a major portion cross sectional view of coupling portion in the boot 1 showing the mode of 3rd embodiment according to this invention.

The engaging portion 8 of coupling portion 4 in FIG. 8 is formed to a convex portion of semi-sphere state. This engaging portion 8 exists in one piece, but may also be installed in plural number like two pieces, three pieces, etc. according to the necessity. Further, a part of outer circumference of engaging portion 8 may be cut so as to have an elasticity.

On the other hand, the coinciding female portion 13 of female coupling portion 5 for engaging the engaging portion 8 is formed with a punched hole. And the engaging portion 8 of male coupling portion 4 is fitted to and engaged with the coinciding female portion 13 of this hole shape. Further, the mutually bent and opposed side plates 19 are joined so as to enclose the lateral side of acceptance portion 12 to both the sides of acceptance portion 12.

Further, an integral portion 18 by pin is formed inside the acceptance portion 12, and plays a role of strongly coupling the female coupling portion to the second split portion 3. This pin shaped integral portion 18 can hold the interval of acceptance portions 12 so that it may not become smaller and can facilitate the insertion of insertion portion 6 of male coupling portion 4.

The merit of boot 1 in FIG. 8 resides in such facts that the shape of respective coupling portions 4 and 5 can be easily fabricated and the cost can be decreased. Namely, the engaging portion 8 can be easily fabricated because it can be formed by press-stamping a steel ball. Further, the coinciding female portion 13 can be quite easily fabricated because it may be a through-hole by the punching or drilling.

Figure 9:
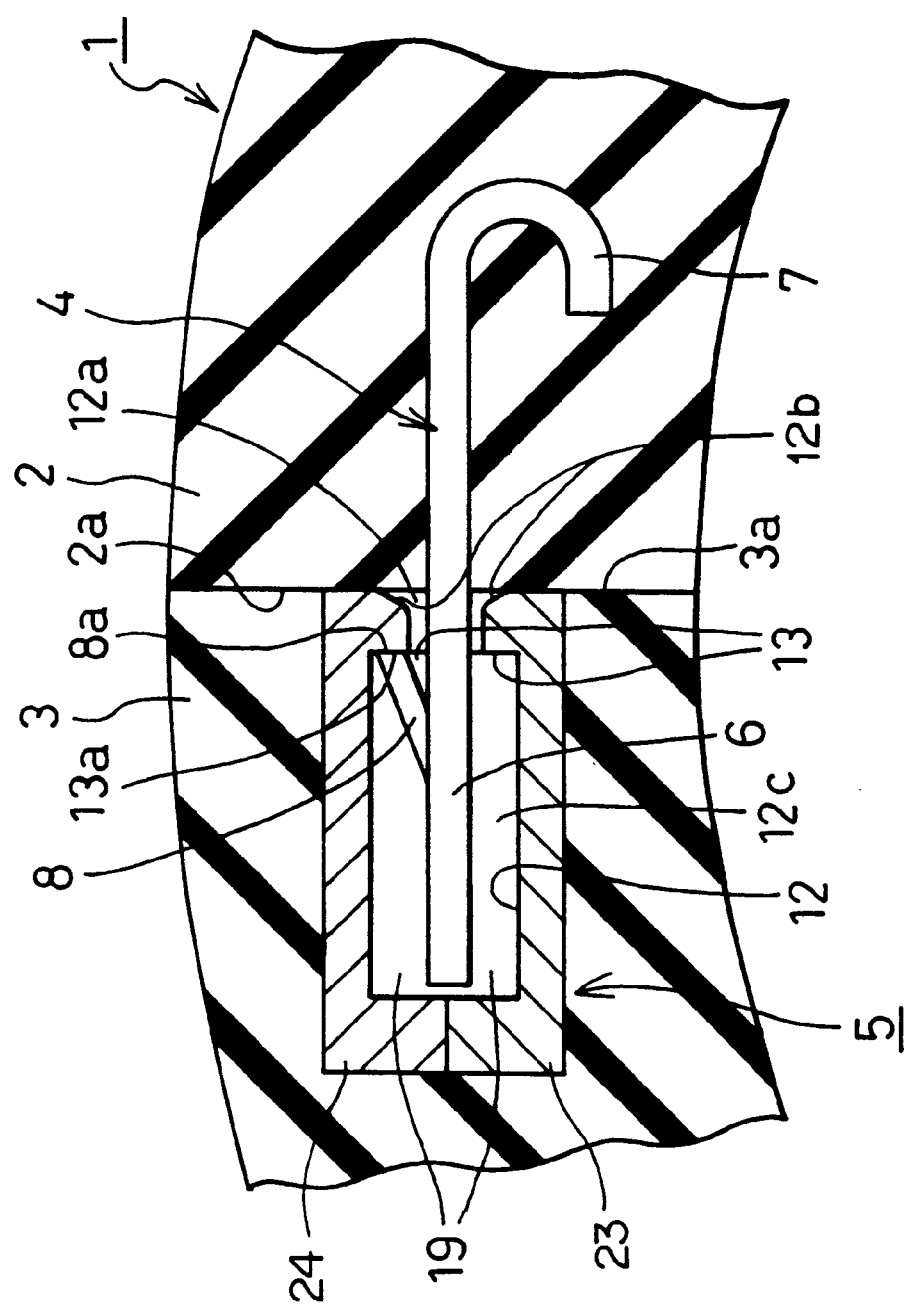
FIG. 9 is a cross sectional view showing the respective coupling portions owned to the first split portion and the second split portion of boot in the mode of still another embodiment relating to the present invention.

FIG. 9 is a major portion cross sectional view of coupling portion of boot 1 showing the mode of still another embodiment according to this invention.

In FIG. 9, the male coupling portion 4 is formed to a plate shape, and the integral portion 7 coupling with the first split portion 2 at one end side is bent to a semi-circular shape. This integral portion 7 is formed to a semi-circular shape, but may also be formed to an L-shape or a circular shape. In case of the circular shape, a pit may be fitted inside the circular shape.

An engaging portion 8 is formed to the insertion portion 6 of male coupling portion 4 protruding out of the first split face 2a of first split portion 2. The coinciding portion 8 having an elasticity to this leaf spring shape is partially cut in the plate shape and bent to an inclination state. This male coupling portion 4 is made of metallic material but can also be made of resin material.

Figure 10:
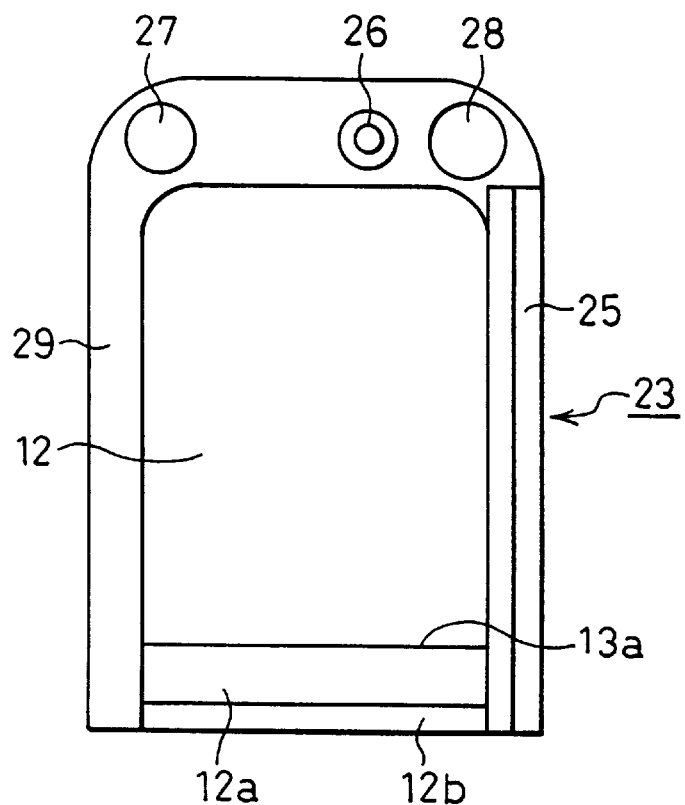
FIG. 10 is a plane view of split part on one hand of female coupling portion of FIG. 9.
Figure 11:
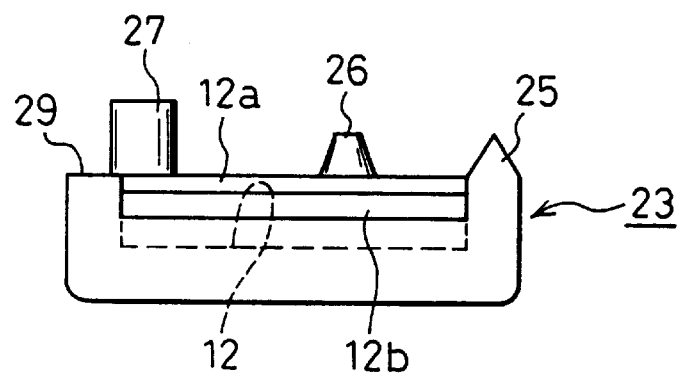
FIG. 11 is a lateral side view from the insertion side of split part on one hand of FIG. 10.

FIG. 10 is a plane view of split part 23 on one side of female coupling portion 5. Further, FIG. 11 is this lateral face view.

The female coupling portion 5 made of resin material is buried into the second split portion 3. The split part 23 on one side formed as shown in the plane view of FIG. 10 is opposed to the split part 24 on the other side formed in the same way with the split part 23 on said one side and not shown in the figure and they are deposited and integrally formed into the formation of this female coupling portion 5 as shown in FIG. 9. And, a chamfer 12b is provided to the insertion inlet 12a of acceptance portion 12 and formed so that the male coupling portion 4 can be easily inserted.

In the deposition of this female coupling portion 5, the first deposition portion 25 protruding to a triangle shape in cross section in the split face 29 and the second deposition portion 26 protruding to a conical shape in cross section are mutually deposited flatly to the counterpart split faces 29, and the acceptance portion 12 is formed to an empty chamber 12c as shown in FIG. 9. Moreover, Numeral 27 is a positioning pin. Further, Numeral 28 is a positioning pin hole fitting with this positioning pin 27.

The coinciding female portion 13 for accepting the engaging portion 8 formed on the male coupling portion 4 is formed to the female coupling portion 5. And the tip portion 8a provided to the engaging portion 8 coincides to the contact portion 13a of coinciding female portion 13 and joins the first split face 2a with the second split face 3a.

The layout of this male coupling portion 4 and female coupling portion 5 should preferably be integrated into the film in the midway between the crest portion 10 and the valley portion 11 as shown in FIG. 2 and FIG. 3. For information, the split part 23 on one side and the split part 24 on the other side can also be bonded in addition to the deposition. These parts can also be made of metallic material in addition to the resin material.

Because this female coupling portion 5 is formed to a box shape, this portion is convenient for preventing the inflow of mold material during the molding and for integrally being molded with the second split portion 3.

For information, FIG. 4 and FIG. 7 employ such a design similarly to FIG. 8 and obtain a favorable result that the lateral plates bent to the side face of acceptance portion 12 of female coupling portion 5 are opposed to each other and the acceptance portion 12 is enclosed to a square shaped empty chamber.

Figure 12:
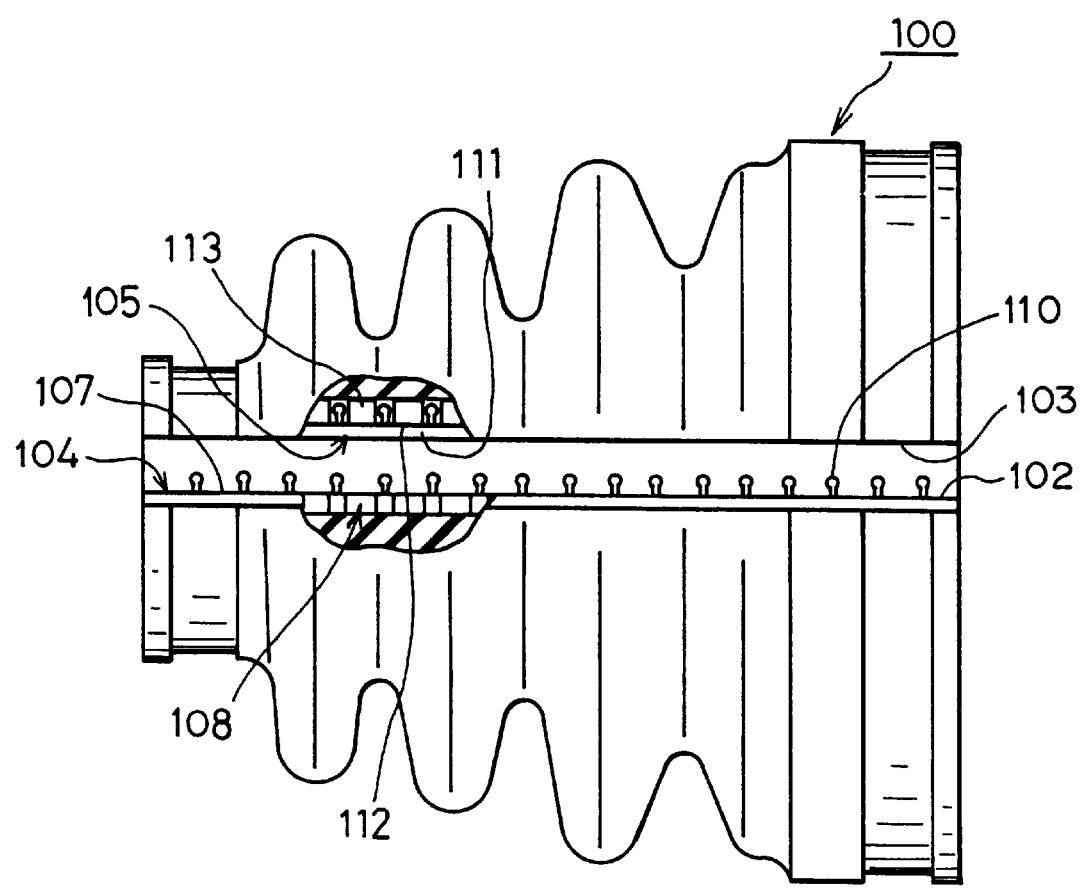
FIG. 12 is a lateral side view of boot relating to the mode of first embodiment of this invention.

FIG. 12 is a lateral face view showing the coupling portion side in the boot 100 in the pattern of 4th embodiment relating to this invention.

In FIG. 12, Numeral 100 stands for a boot. The boot is fabricated by cure-molding the rubber material, but this boot 100 is split at one place in axial direction, and the split face side on one side is separately formed from the first split portion 102 and the split face side on the other side is separately formed from the second split portion 103.

Figure 13:
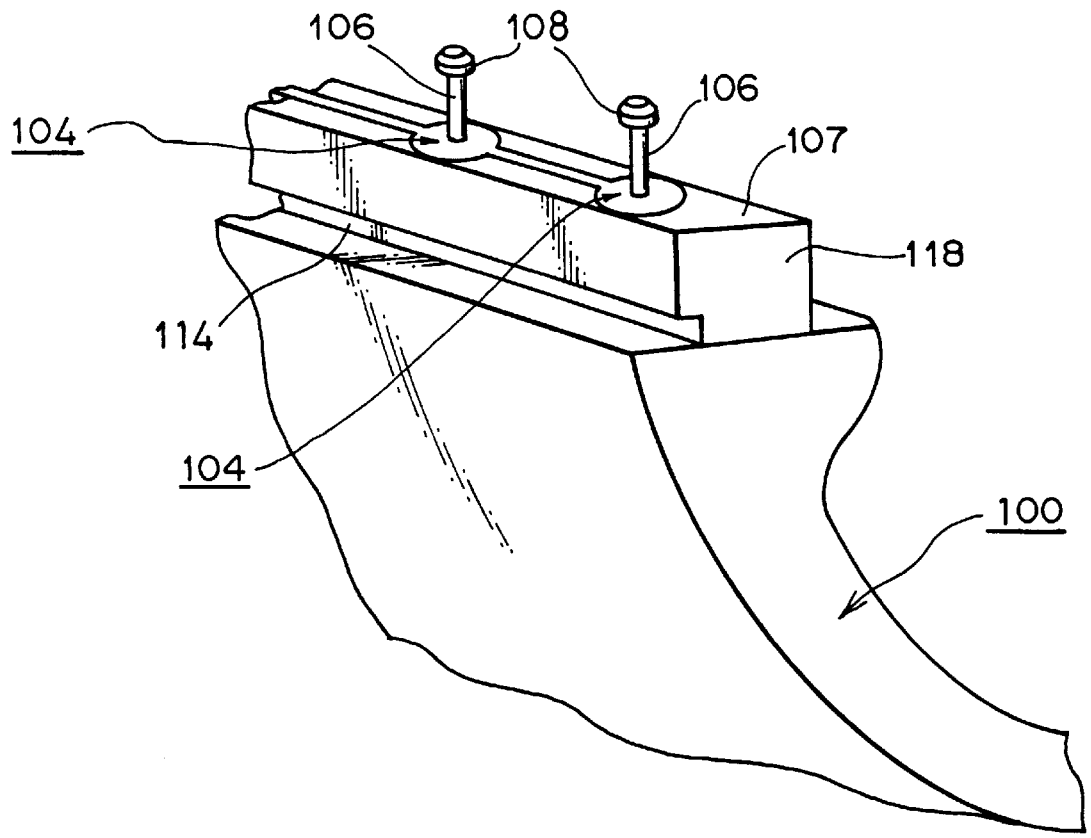
FIG. 13 is an oblique view of male coupling portion shown in FIG. 1.
Figure 14:
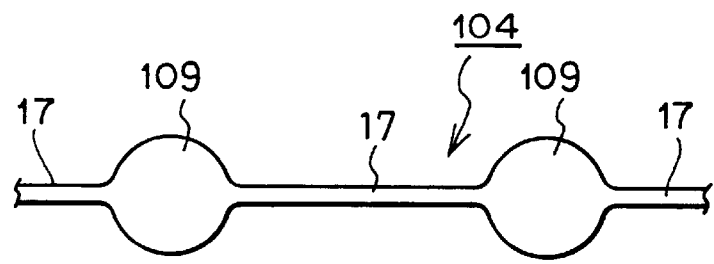
FIG. 14 is a plane view of engaging portion shown in FIG. 2.

And on the side of first split portion 102, the coupling portion in the shape as shown in FIG. 13 is formed. In this FIG. 13, a part of male coupling portion is an oblique view. In FIG. 13, the male coinciding portion 118 protruding to a concave portion in its cross section is provided to this coupling portion. Further, a coinciding groove 114 is formed on the root side of lateral face of male coinciding portion 118. Furthermore, the male coupling portion 104 made of resin material as shown in FIG. 13 and FIG. 14 not only buries the side of larger diameter fixed portion 109 to the first split portion 102 but also the insertion portion 106 is integrally adhered as if it protrudes out to the side of end face 107 of male coinciding portion 118. FIG. 14 is a plane view of male coupling portion 104, and FIG. 15 is a lateral face view.

Figure 15:
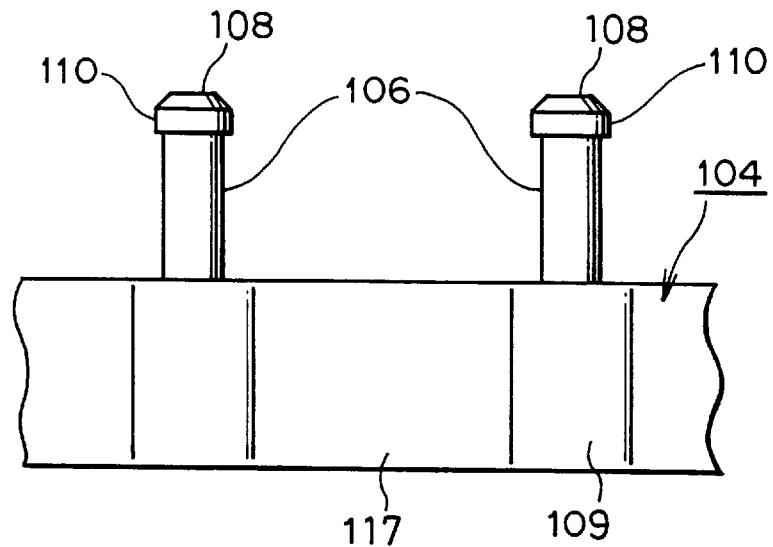
FIG. 15 is a lateral side view of engaging portion shown in FIG. 3.

In FIG. 14 and FIG. 15, the male coupling portion 104 is structured in such a manner that the coinciding portion 108 formed on the conical shaped top state outside face 110 is not only formed to the tip but this coinciding portion 108 is also engaged with the stage portion 121 fitted to and provided inside the female hole 116 corresponding to the coinciding female portion 113 being described later. The top state outside face 110 is the embodiment mode of engaging portion 108.

It is recognized that the similar function can be exhibited even if this top state outside face 110 should be formed to a spherical shape or a column shape in addition to the conical shape.

Further, it is recognized favorable to split the insertion portion 106 by the slitting work to the axial direction from the tip face and to provide an elastic portion for facilitating its insertion. Especially, it is favorable to split the insertion portion into three equal portions. The mode of this favorable embodiment is to be described later.

Moreover, it is also recognized more favorable to provide a split portion coinciding with the protruded wedge to the coinciding portion 108 for expanding the coinciding portion 108, and to coincide it so that it may not get separated from the coinciding female portion 113.

The fixed portion 109 of male coupling portion 104 is interconnected by use of a thin interconnection plate 117. This interconnection plate 117 is formed to a thin thickness so that it may exhibit its flexibility. However, because this interconnection plate 117 is not a part of the structure of male coupling portion 104 but is an ancillary one, the function is available even if there is no interconnection plate 117.

Figure 16:
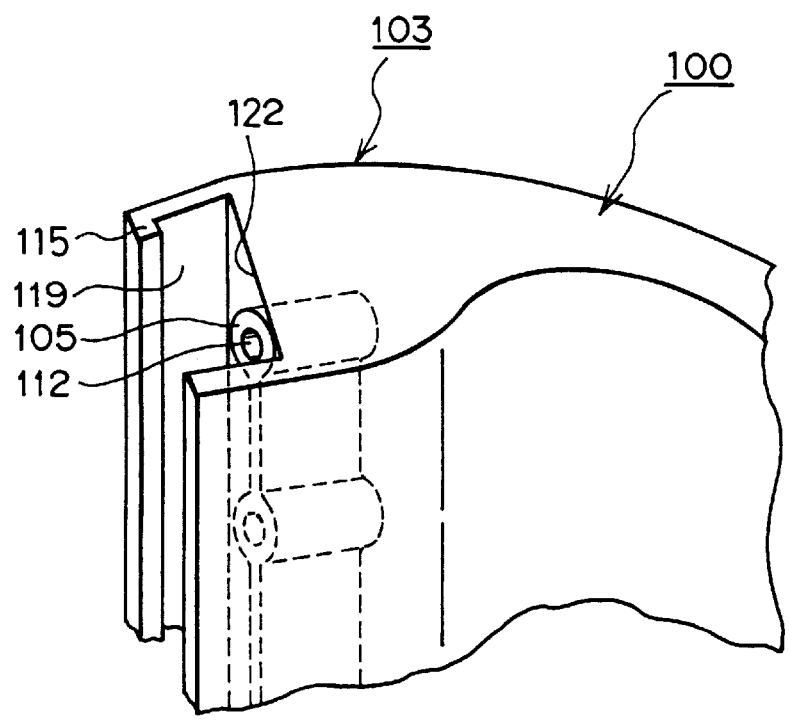
FIG. 16 is an oblique view of engaging portion shown in FIG. 1.

Further, as shown in FIG. 12, the coupling portion is formed to the side of second split portion 103. The detailed view of coupling portion is as shown in FIG. 16. FIG. 16 is an oblique view showing a part of coupling portion. In FIG. 16, the male coinciding portion 118 and the fitting concave state female coinciding portion 119 are formed on the coupling portion. Further, a hook portion 115 is formed on the outside concave shape end portion to this female coinciding portion 119 and is structured in such that it may be inserted together with the engaging groove 114.

Further, to the female coinciding portion 119, the female coupling portion 105 made of resin material is buried to the bottom face 122 of concave portion and is integrally fixed.

Figure 17:
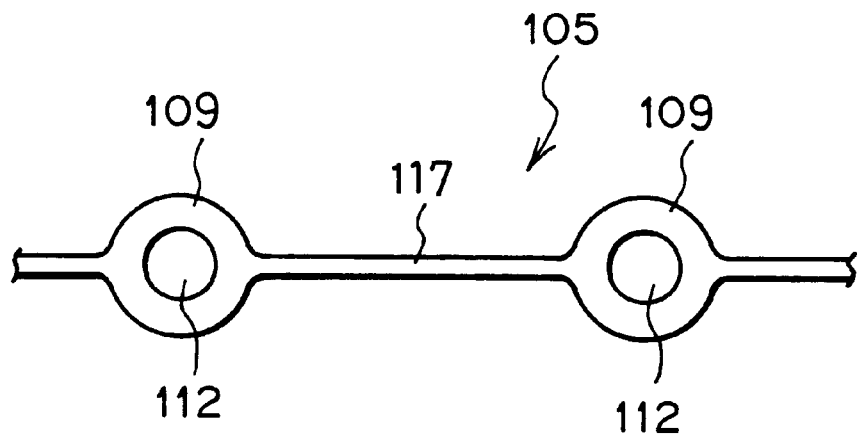
FIG. 17 is a plane view of coinciding female portion shown in FIG. 5.
Figure 18:
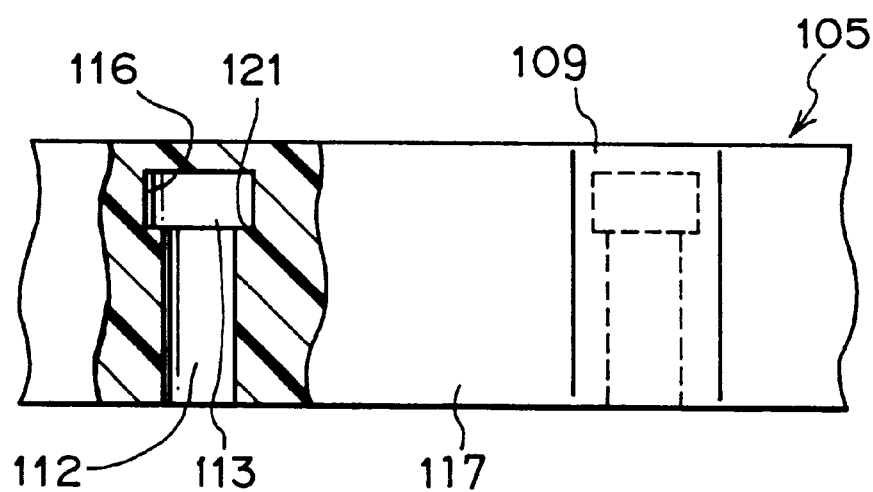
FIG. 18 is a lateral side view of coinciding female portion shown in FIG. 6.

This female coupling portion 105 is made of resin material and is formed to the shape shown in FIG. 17 and FIG. 18. FIG. 17 is a plane view of this female coupling portion 105 and FIG. 18 is its lateral face view.

In FIG. 17 and FIG. 18, an acceptance portion 112 is formed on the female coupling portion 105 of cylindrical shape having a bottom, and the stage portion 121 by use of a large diameter female hole corresponding to the coinciding female portion 113 is formed to the interior. This stage portion 121 is structured in such that it may get engaged with the engaging portion 108 formed on the top shape outside face 110.

In the female coupling portion 105, the respective fixed portions 109 are integrally interconnected with each other by use of the interconnection plate 117. This interconnection plate 117 is structured in such as exhibiting the flexibility similar to the interconnection plate 117 of male coupling portion 104. However, this interconnection plate 117 is not a structural part of female coupling portion 105 but is an additional technique.

The protrusive wedge coinciding with the split portion of coinciding portion 108 is provided to the bottom face of acceptance portion 112, and it is recognized favorable if the coinciding portion 108 formed on the top shape outside face 110 should be expanded by the wedge and coincided securely to the stage portion 121. Further, it is also possible to enter a slit up to the midway along the shaft of acceptance portion 112 into the female coupling portion 105 for providing an elasticity and to make it easier to insert the coinciding portion 108.

The above mentioned male coupling portion 104 and female coupling portion 105 are processed by molding the resin material according to the separate manufacturing process. And, when cure-molding the boot 100, the male coupling portion 104 and the female coupling portion 105 are arranged inside the molding die for their cure-bonding and integration.

The acceptance portion 112 of female coupling portion 105 may also be formed to an oval hole in cross section in addition to the circular hole. And if both the side faces of top shape coinciding portion 108 should be cut for form a parallel face, and if the engaging portion 108 should be inserted into the oval hole from this parallel face and engaged with the stage portion 121, the insertion becomes easier.

Figure 19:
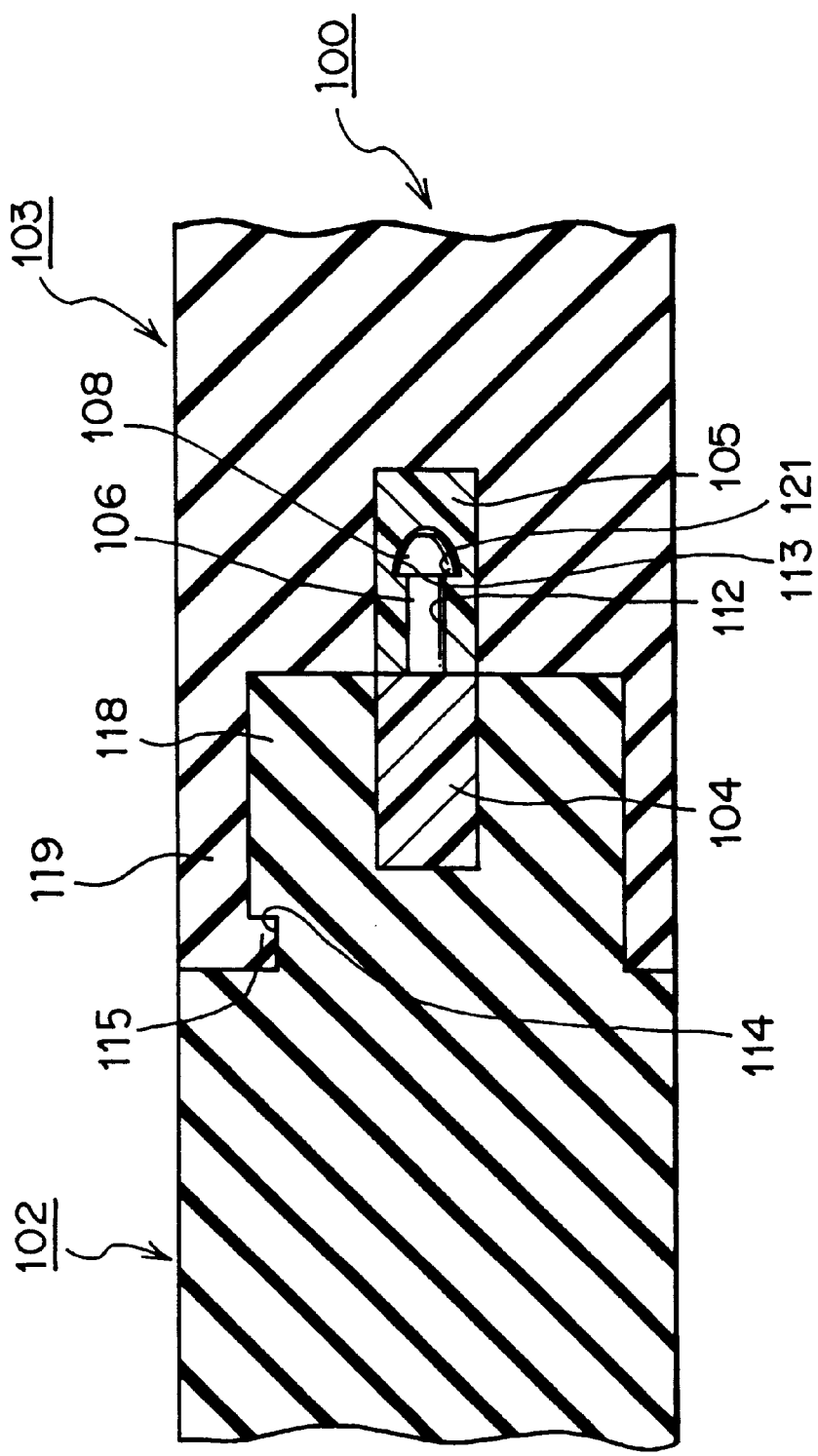
FIG. 19 is a cross sectional view in the coupled status of both the coupling portions of boot shown in FIG. 1.

FIG. 19 is a cross sectional view showing the coupling status between the coupling portions of both the parties.

In FIG. 19, the insertion portion 106 is fitted to the acceptance portion 112 of female coupling portion 105, and the engaging portion 108 provided on the insertion portion 106 engages to the stage portion 121 of female hole 116 for closely contacting the first split portion 102 to the second split portion 103. At the same time, by inserting the male coinciding portion 118 into the female coinciding portion 119 and also by coupling the hook portion 115 to the coinciding groove 114, the prevention of outflow of grease and the like toward the interior can be securely done but the prevention of dust invading from the outside can also be effectively exhibited. For reference, it is also acceptable to intervene the bonding agent to the joint face between the male coinciding portion 118 and the female coinciding portion 119.

Figure 21:
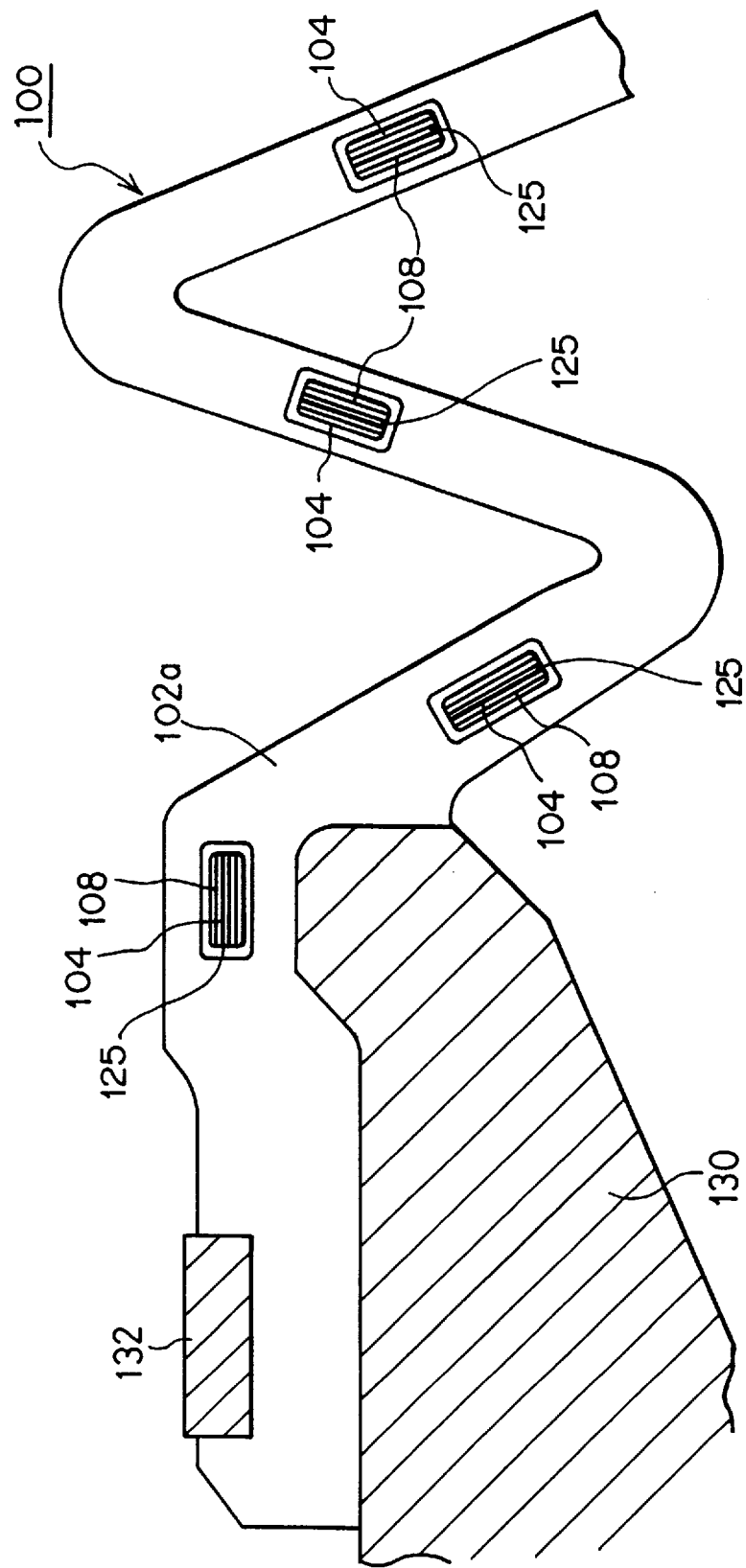
FIG. 21 is a partial plane view of first split face of boot relating to the mode of 2nd embodiment of this invention.
Figure 22:
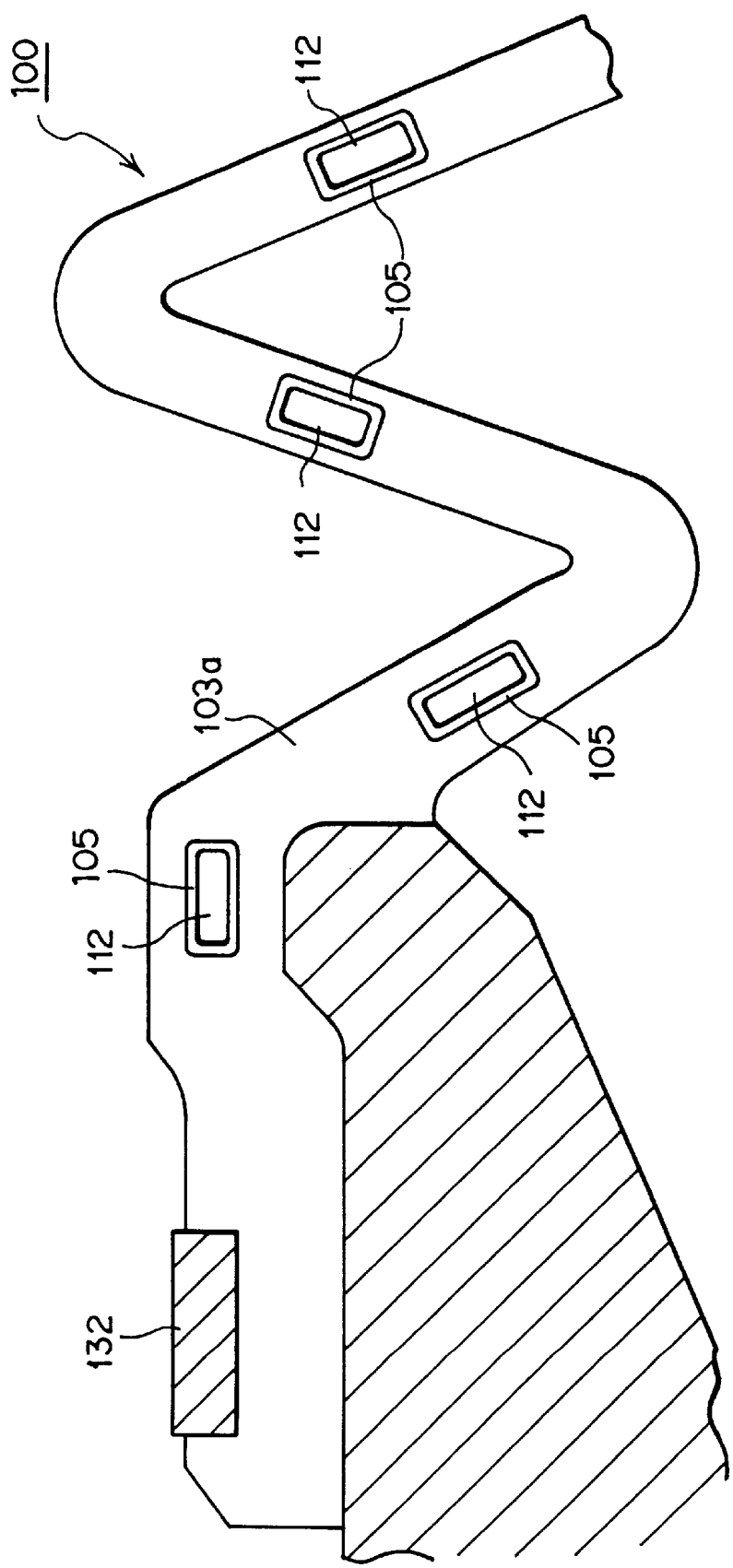
FIG. 22 is a partial plane view of second split face joining to the first split face shown in FIG. 10 of this invention.

Next, the favorable boot as the mode of 5th embodiment is shown in FIG. 21 and FIG. 22.

FIG. 21 is a plane view of split face on the side of larger diameter mounting portion of first split 102 of boot 1.

The male coupling portion 104 having an engaging portion 108 which is wide in width to the longitudinal direction of first split face 102a is integrally mounted to the mounting portion of first split face 102a and to the split portion between the crest portion and the valley portion. This male coupling portion 104 can be integrated through integral molding or by providing the mounting hole to the boot 100 and fitting its mounting hole to the male coupling portion 104.

FIG. 22 is a plane view of split face on the side of large diameter mounting portion of the second split face 103a of boot 100. To this second split face 103a, the female coupling portion 105 is installed to the position corresponding to the male coupling portion 104 installed on the first split face 102a. This female coupling portion 105 is also integrally molded to or adhered to the boot 10 by its fitting. For information, Numeral 132 is a band for mounting the boot 100 to the shaft coupling 130.

Figure 23:
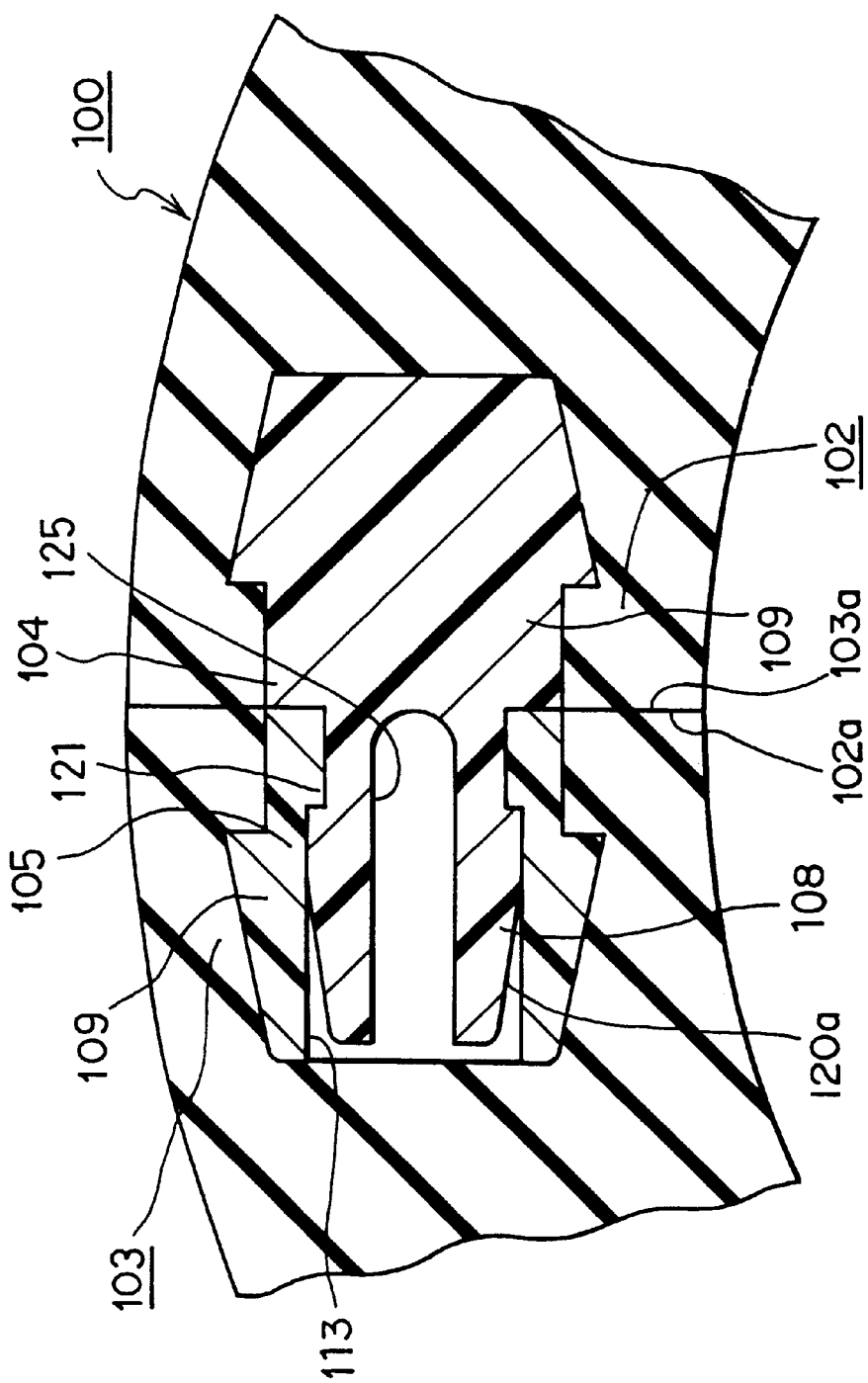
FIG. 23 is a cross sectional view in the coupled status between the engaging portion and coinciding female portion of this invention.
Figure 25:
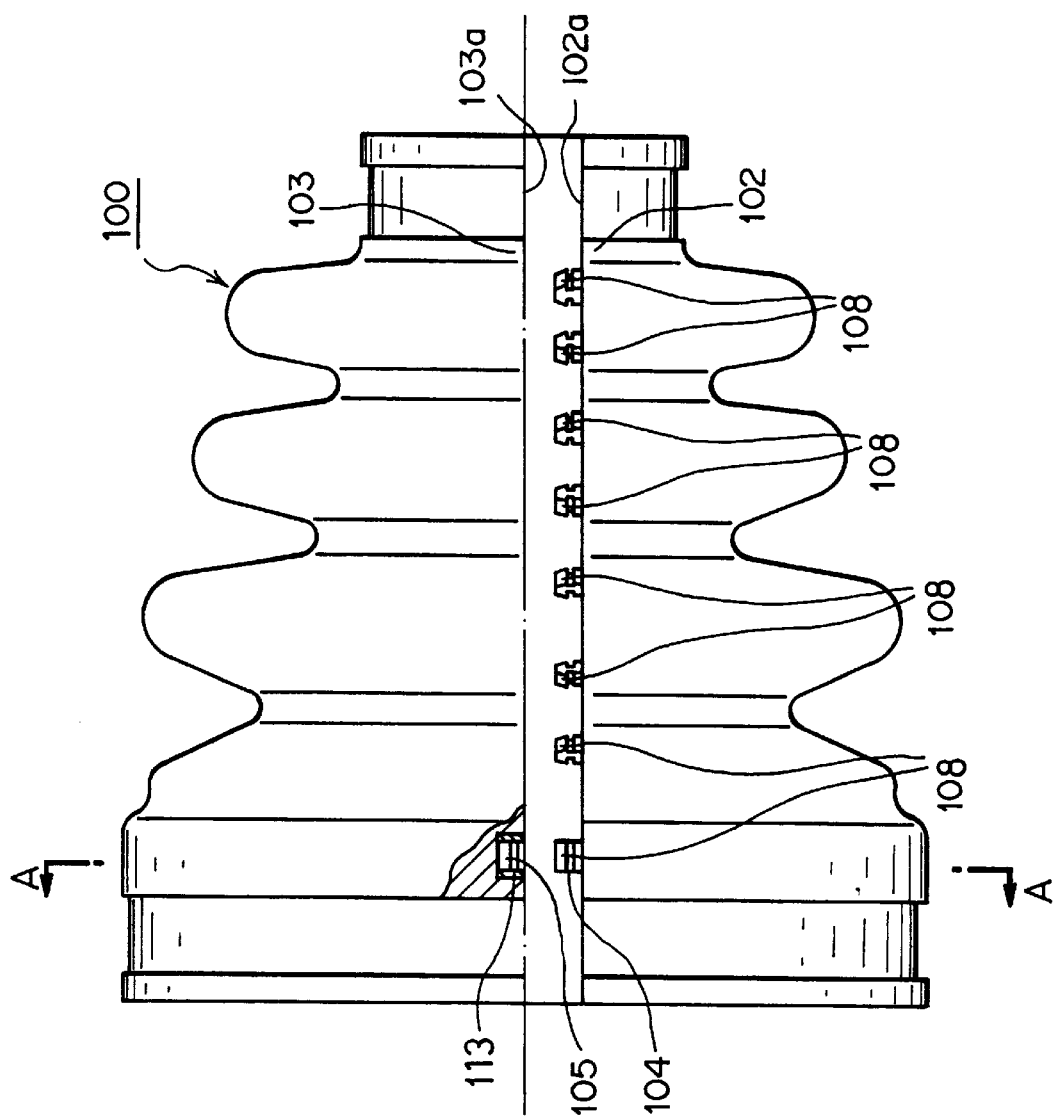
FIG. 25 is a lateral side view of split face side of boot in the mode of another embodiment of this invention.
Figure 26:
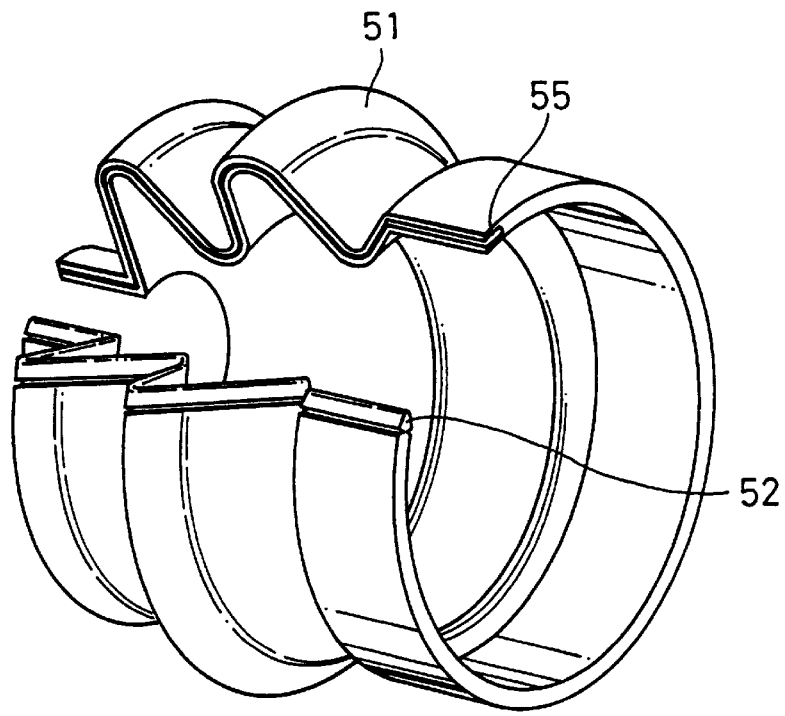
FIG. 26 is an oblique view of conventional split boot.
Figure 27:
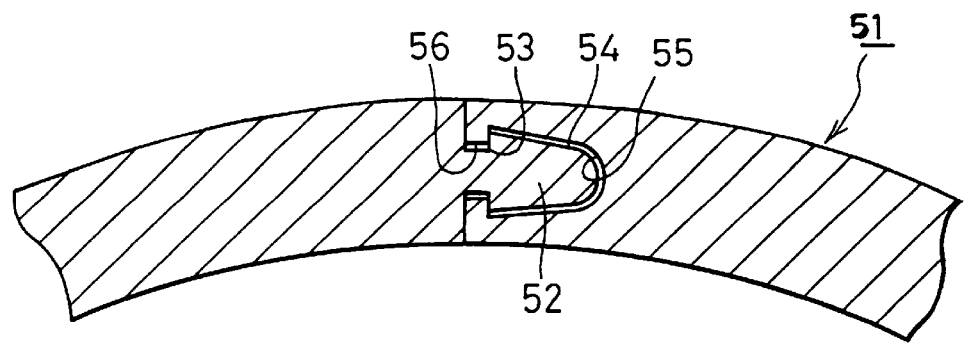
FIG. 27 is a cross sectional view having coupled the split portions of FIG. 26.

FIG. 23 is a cross sectional view taken along the line A—A shown in FIG. 25 in the status coupling the above mentioned male coupling portion 104 with the female coupling portion 105.

In FIG. 23, the fixed portion 109 is not only integrally coupled to the interior of first split portion of boot 100, but the tip side of protrusive insertion portion 106 also has an inclined face 120a on both the sides and is formed to a wide width wedge shape in a right angle direction against the cross sectional view in the male coupling portion 104 made of resin material. And the engaging portion 108 having a stage portion is formed on the side of root. Further, a concave portion 125 leading to the interior from the tip face is formed on the insertion portion 106. This concave portion 125 penetrates in the wider width direction and is structured in such that the wedge status portion of engaging portion 108 may get elastically deformed for its easier insertion into the female hole 116.

Further, the female coupling portion 105 made of resin material is fixed to the interior of second split portion 103. This female coupling portion 105 not only has an acceptance portion 112, but a stage portion 121 engaging with the engaging portion 108 of insertion portion 106 is also formed to the acceptance portion 112. And the acceptance portion 112 is structured in such a manner that it is formed to an oval hole in a right direction against the cross sectional view and gets coincided with the insertion portion 106.

Figure 20:
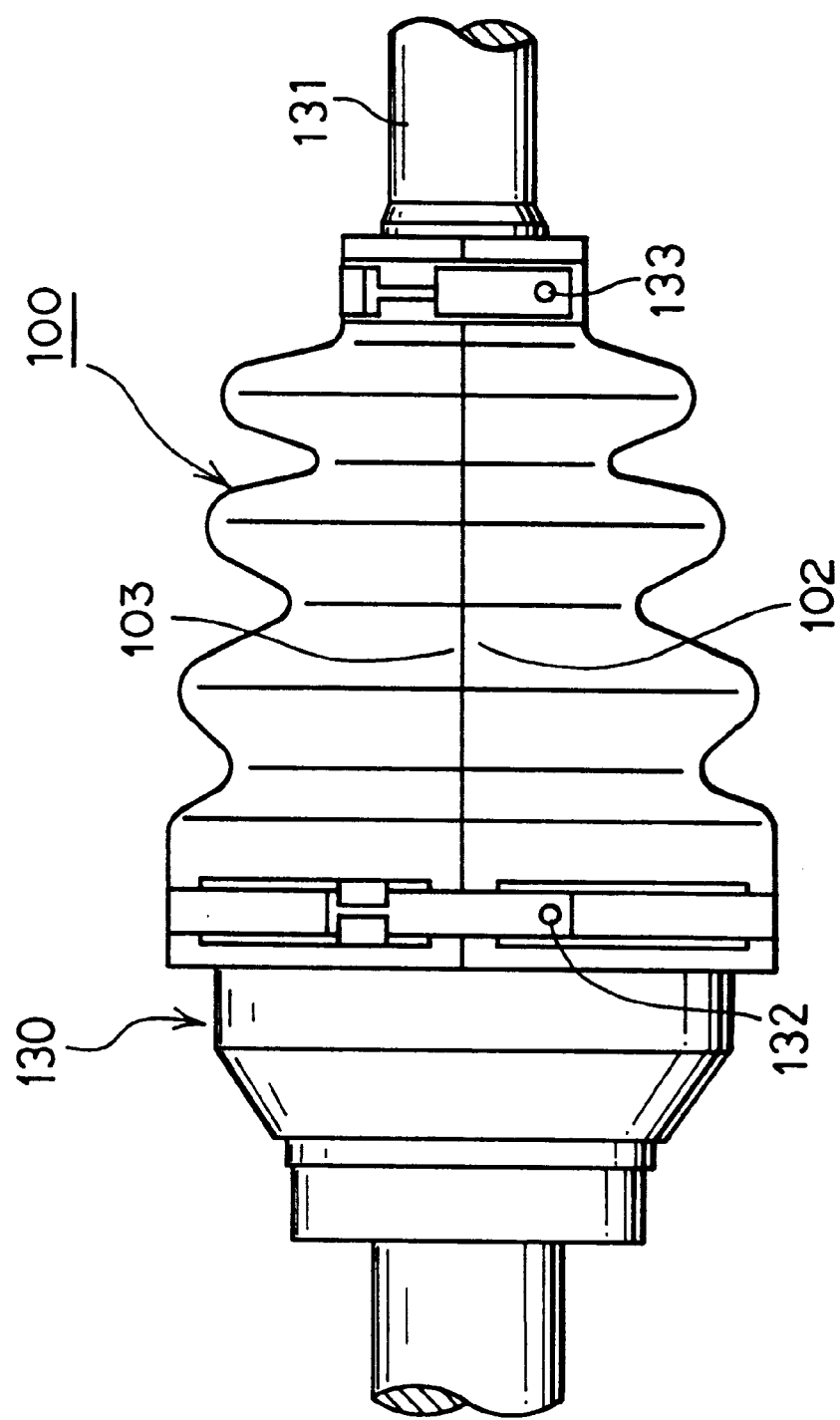
FIG. 20 is a plane view of the boot according to this invention, which is assembled to the flexible coupling.

If this insertion portion 106 should be inserted into the acceptance portion 112, the insertion portion 106 is elastically deformed by the concave portion 125 for its insertion into the acceptance portion 112. And, the engaging portion 108 engages to the stage portion 121 of coinciding female portion 113 and makes the first split portion 102 contacted with the second split portion 103. The entire joined status of both the split portions 102 and 103 shall be made the situation as shown in FIG. 20. Further, the joining force in circumferential direction can be made stronger by elongating the insertion portion 106 and the acceptance portion 112 in a right angle direction against the cross sectional view. Especially, because the inclined face whose tip side of engaging portion 108 becomes thinner is not only provided but the concave portion 125 is also provided, the insertion portion 106 can be inserted easily and moreover engaged easily.

FIG. 25 is a lateral face view before both the split portions 102 and 103 are coupled together. The male coupling portion 104 and the female coupling portion 105 owned on the side of respective split faces 102a and 103a are integrally coupled in opposition to the first split portion 102 and the second split portion 103 singularly without being coupled with the interconnection plate 117. This integral coupling molding can be done easily by arranging and molding the male coupling portion 104 and the female coupling portion 105 at the stipulated position inside the molding die.

Further, in the mode of this embodiment, the split face in radial direction or the inclined split face having no male engaging portion 118 and female engaging portion 119 in FIG. 12 is closely coupled directly by the male coupling portion 104 and the female coupling portion 105.

Furthermore, in the mode of this embodiment, a concave and a convex portion forming the annular state of semi-sphere may be provided to the inside and outside of boot radial direction of coupling face for their close contact against the male coupling portion 104 and female coupling portion 105.

As shown in FIG. 25, a great number of male coupling portions 104 are arranged and fixed in the state protruding from the insertion portion 106 along the split face on the first split face 102a. Further, on the second split face 103a, the entirety of female coupling portion 105 is arranged at the position corresponding to a great number of male coupling portions 104 along the second split face 103a so that the entirety may be buried in. FIG. 20 is a plane view assembling the boot 100 to the shaft coupling 130 and the shaft 131. In FIG. 20, the first and second split faces 102a and 103a of boot 100 shall be opened and the boot shall be assembled from the side direction of shaft coupling 130.

And, by fitting the male coupling portion 104 into the female coupling portion 105, the first split face 102a and the second split face 103a as shown in FIG. 20 become the joined status. Next, the mounting portions of both the end sides shall be tightened by the bands 132 and 133 for their fixation and fitting.

Figure 24:
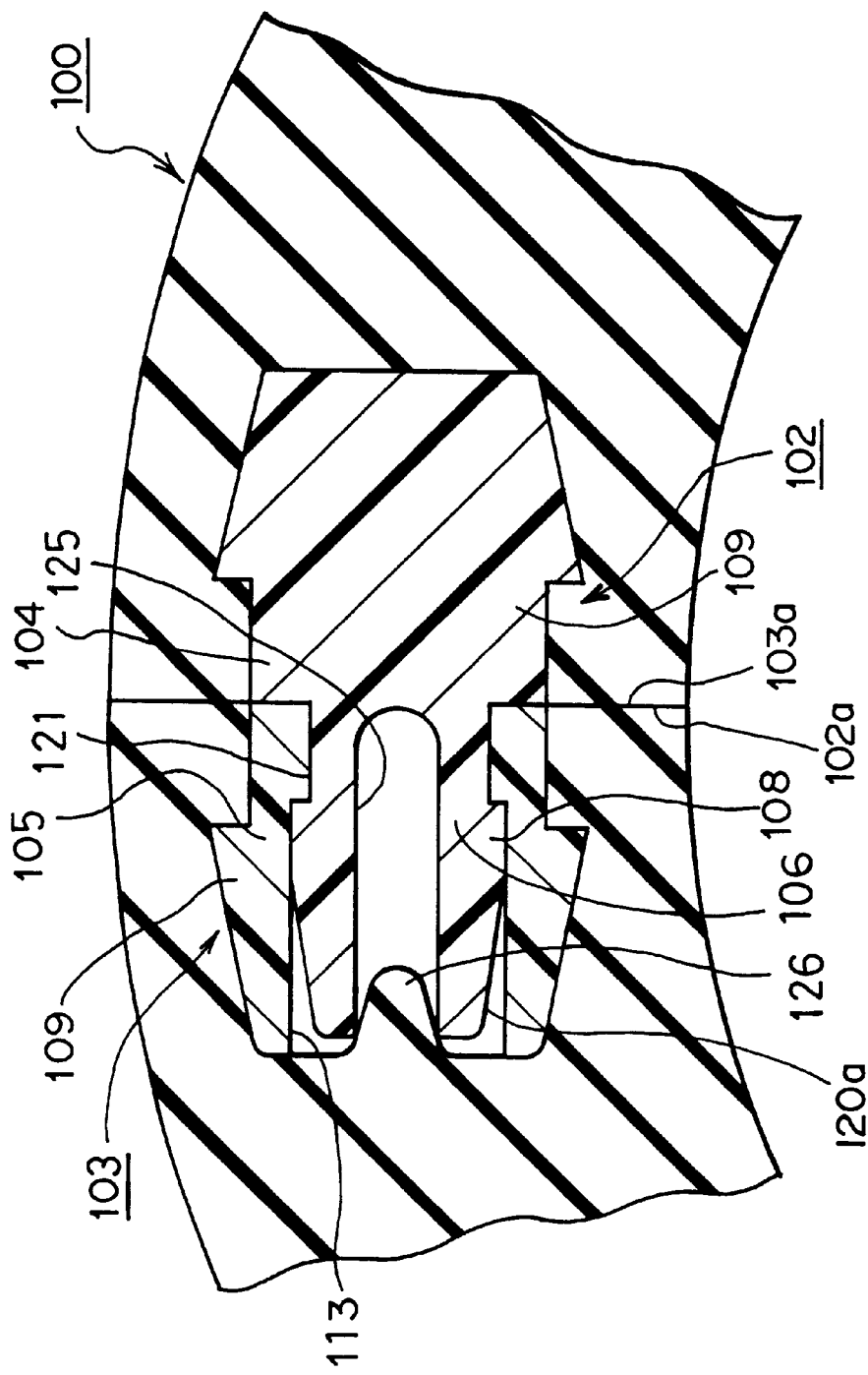
FIG. 24 is a cross sectional view in the coupled status between the engaging portion and the coinciding female portion in the mode of another embodiment of this invention.

FIG. 24 is a view where a convex portion 126 is provided innermost of the acceptance portion 112 of female coupling portion 105 for its fitting with the concave portion 125 so that the insertion portion 106 may be caught mutually to the side of concave portion 125 and the engaging portion 108 and the stage portion 121 may not get separated. The effect of sealing the inside and outside of boot 100 can be exhibited by the joint between this convex portion 126 and the engaging portion 108 on the side of concave portion 125. In the mode of these embodiments, it may be acceptable to install semi-spherical concave and convex forming an annular state to the side of inside and outside diameters of male coupling portion 104 and female coupling portion 105 of both the split face, for their close contact with each other and for providing the sealing ability.

For information, when integrally molding the male coupling portion 104 and the female coupling portion 105 into the formation of boot 100, it is also possible to coat a bonding agent to the fixed portions 109 and 109, fitting them to the mounting hole provided on the boot 100 and baking it by the secondary curing in addition to directly baking and molding it inside the above mentioned molding die.

Because the boot of this invention is structured in such a way that the male coupling portion structured of the similar material is inserted into the female coupling portion having the elasticity with the hard quality material for engaging the engaging portion to the coinciding female portion, its insertion is easy, and moreover because this engaging portion is engaged mechanically with the coinciding female portion, the separation can be effectively prevented even if the joined split face of boot should be subjected to the outside force.

Moreover, because the pull-out engagement between the engaging portion and the coinciding female portion is elastically deformed for their engagement, it becomes possible to couple them with each other so as to pressure contact the first and second split faces with each other. Therefore, it becomes possible to join the mutually joined split faces to a sealed status.

Especially it is difficult to mutually join the split faces with each other because the split faces of boot are in bellows status, but it is easy to join the split faces mutually with each other because they are coupled to each other strongly only by pressure contacting the male coupling portion to the female coupling portion.

In the boot of this invention, because the engaging portion of male coupling portion having an elasticity is not only engaged to the coinciding female portion but the insertion portion also won't get contacted strongly with the acceptance portion, only the engaging portion can be pressure contacted with the coinciding female portion. For this reason, even if the first split face and the second split face are not formed to the same plane face, it becomes possible for the engaging portion to get pressure contacted to the coinciding female portion so that the first split face and the second split face may be joined. As a result, the present invention provides such an effect for the sealing force of split faces to be reinforced by seal-joining the first split face with the second split face.

The boot of this invention may have the male coupling portion of harder material than the boot arranged and coupled respectively along the axial direction to the coupling portion, and has an engaging portion in protrusion to this male coupling portion. The female coupling portion on the other side is also formed and arranged in such a way that it can be coupled in correspondence to the male coupling portion. For this reason, because the respective coupling portions are arranged so that they may exist sporadically in the axial direction of each split portion, if the male coupling portion should be coupled to the female coupling portion one by one, they can be easily coupled with each other even if the coupling portion should be crooked to a bellows status. Moreover, because the male coupling portion and the female coupling portion are harder in material than the boot, the coupling force of both the parties becomes stronger when they are press-fitted. In addition, because the male coupling portion and the female coupling portion are independent from each other, such an effect can be expected to exhibit the flexibility without aggravating the flexibility of boot even if the male coupling portion and the female coupling portion are harder material.

Because the boot of this invention according to may enlarge the male coupling portion and the female coupling portion in one direction, the coupling force in circumferential direction becomes stronger. Further, because a concave portion is provided to the insertion portion and the male coupling portion and the female coupling portion are elongated in the longitudinal direction of split face, the insertion becomes easier when they are to be coupled.

In the boot of this invention, because the male coupling portion and the female coupling portion are interconnected by use of the interconnection plate with each other, the positioning of both the parties during the molding is simple, and moreover it becomes possible to couple them strongly with the coupling portions.

In the boot of this invention, because the opposing concave portion male coinciding portion and convex portion female coinciding portion are installed to both the coupling portions, the seal joining can be expected if both the coinciding portions should be coupled by means of the male coupling portion and female coupling portion. Moreover, because the coinciding groove and the hook groove existing on both the coinciding portions are fitted with each other, further the sealing effect can be expected.

What is claimed is:

1. A split boot for use with a shaft coupling, comprising:

a first split boot portion having a first split face and a plurality of spaced male coupling portions, each of said male coupling portions including a fixed portion, an insertion portion extending from the fixed portion, and an engaging portion extending from the insertion portion, and a second split boot portion having a second split face and a plurality of spaced female coupling portions that mate with the male coupling portions, each of the female coupling portions having an acceptance portion into which each said insertion portion is inserted and an engaged female portion that receives each said engaging portion, whereby a predetermined amount of contact pressure is maintained between the first split face of the first split portion and the second split face of the second split portion.

2. A split boot as described in claim 1, wherein each said engaging portion protrudes from a lateral face of the insertion portion and is elastically deformed and inserted by mutual pressures.

3. A split boot as described in claim 1, wherein an empty chamber of each said acceptance portion is larger than the insertion portion.

4. A split boot as described in claim 1, wherein the male coupling portions are made of a harder material than the material of the first and second split portions and each said engaging portion comprises a tapered tip, and wherein the female coupling portions are made of a harder material than the material of the first and second split portions and each said female coupling portion includes a hole being fitted and engaged with each said engaging portion.

5. A split boot as described in claim 1, wherein each said acceptance portion includes an oval hole in a direction along the said second split portion, and wherein each said insertion portion corresponding to each said acceptance portion is formed to correspond to the oval hole of each said acceptance portion and a concave portion is also formed toward each said fixed portion.

6. A split boot as described in claim 1, wherein each said fixed portion is integrally interconnected by use of an interconnection plate, and wherein each said female coupling portion is also integrally interconnected by use of an interconnection plate.

7. A split boot as described in claim 1, wherein said first split portion has a convex male coinciding portion and a coinciding groove at a base of said convex male coinciding portion, and wherein the second split portion includes a concave female coinciding portion fitted to the convex male coinciding portion and a hook portion coupled to the coinciding groove at the end portion of the concave female coinciding portion.

* * * * *